US007908382B2

(12) United States Patent
Chakra et al.

(10) Patent No.: US 7,908,382 B2
(45) Date of Patent: Mar. 15, 2011

(54) SYSTEM AND METHOD TO OPTIMALLY MANAGE PERFORMANCE'S VIRTUAL USERS AND TEST CASES

(75) Inventors: Al Chakra, Cary, NC (US); Patrick O'Sullivan, Dublin (IE); Sean Callahan, Dublin (IE); Joseph D. Galluzzo, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1155 days.

(21) Appl. No.: 11/422,670

(22) Filed: Jun. 7, 2006

(65) Prior Publication Data

US 2007/0288625 A1 Dec. 13, 2007

(51) Int. Cl.
*G06F 15/16* (2006.01)
(52) U.S. Cl. ........ 709/227; 709/201; 709/218; 709/228; 709/232
(58) Field of Classification Search .................. 709/224, 709/223, 201, 218, 227, 228; 702/182, 183
See application file for complete search history.

(56) References Cited

U.S. PATENT DOCUMENTS

| | | | | |
|---|---|---|---|---|
| 5,812,780 | A | 9/1998 | Chen et al. ............... 395/200.54 |
| 5,974,572 | A | 10/1999 | Weinberg et al. ............... 714/47 |
| 6,122,740 | A | 9/2000 | Andersen ....................... 713/200 |
| 6,505,249 | B1 * | 1/2003 | Rehkopf ....................... 709/224 |
| 6,549,944 | B1 | 4/2003 | Weinberg et al. ............. 709/224 |
| 6,735,719 | B2 | 5/2004 | Moe et al. ....................... 714/38 |
| 6,754,701 | B1 | 6/2004 | Kessner ........................ 709/224 |
| 6,799,213 | B1 | 9/2004 | Zhao et al. ..................... 709/224 |
| 6,862,694 | B1 | 3/2005 | Tormey et al. .................. 714/34 |
| 6,985,940 | B1 | 1/2006 | Jenkin ........................... 709/224 |
| 7,099,797 | B1 * | 8/2006 | Richard ........................ 702/182 |
| 7,111,204 | B1 * | 9/2006 | Couturier et al. ............... 714/39 |
| 2004/0039550 | A1 * | 2/2004 | Myers ........................... 702/186 |
| 2006/0179154 | A1 * | 8/2006 | Sitaraman et al. ............ 709/231 |

OTHER PUBLICATIONS

M. Swift et al., "Improving the Reliability of Commodity Operating Systems," ACM Transactions on Computer Systems, vol. 23, No. 1 Feb. 2005.
G. Denys et al., "A Survey of Customizability in Operating Systems Research," ACM Computing Surveys, vol. 34, No. 4, Dec. 2002.
J. Chapin et al., "Hive: Fault Containment for Shared Memory Multiprocessors," ACM 0-89791-715-4, Dec. 1995.
S. Park et al., "Scalable Data Management Using User-Based Caching and Prefetching in Distributed Virtual Environments," ACM, VRST, Nov. 15-17, 2001, Banff, Alberta, Canada.

(Continued)

*Primary Examiner* — Djenane M Bayard
(74) *Attorney, Agent, or Firm* — Hamilton & Terrile, LLP; Gary W. Hamilton

(57) ABSTRACT

A method, apparatus and computer-usable medium for improved load testing of subsystems comprising a larger system by intelligently and stochastically distracting virtual users from healthy subsystems such that they collaboratively converge on a subsystem exhibiting operating health problems. Virtual users are progressively targeted at a degraded subsystem to force it to sustain its respective share of a test workload, thereby exacerbating its behavior to facilitate problem determination and resolution. Virtual users that have failed or terminated in an unhealthy subsystem are replaced by selectively and intelligently redistributing virtual users from healthy systems. As virtual users are redistributed to the degraded subsystem and fail or terminate, additional performance and behavior data is generated as the subsystem degrades to an unusable or non-operational state. By accelerating time-to-failure, test cycle intervals are reduced and the number of identified performance defects are maximized.

20 Claims, 20 Drawing Sheets

OTHER PUBLICATIONS

K. Lee et al., "A Scalable Dynamic Load Distribution Scheme for Multi-Server Distributed Virtual Environment System with Highly-Skewed User Distribution," ACM, VRST, Oct. 1-3, 2003, Osaka Japan.

* cited by examiner

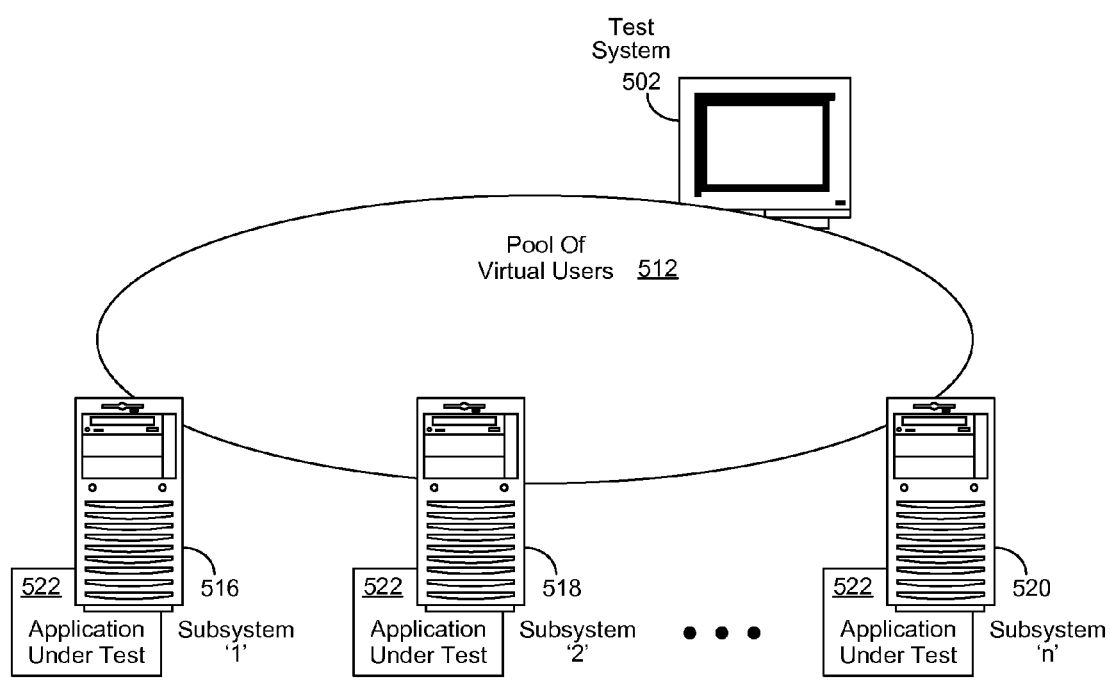
Prior Art FIGURE 5

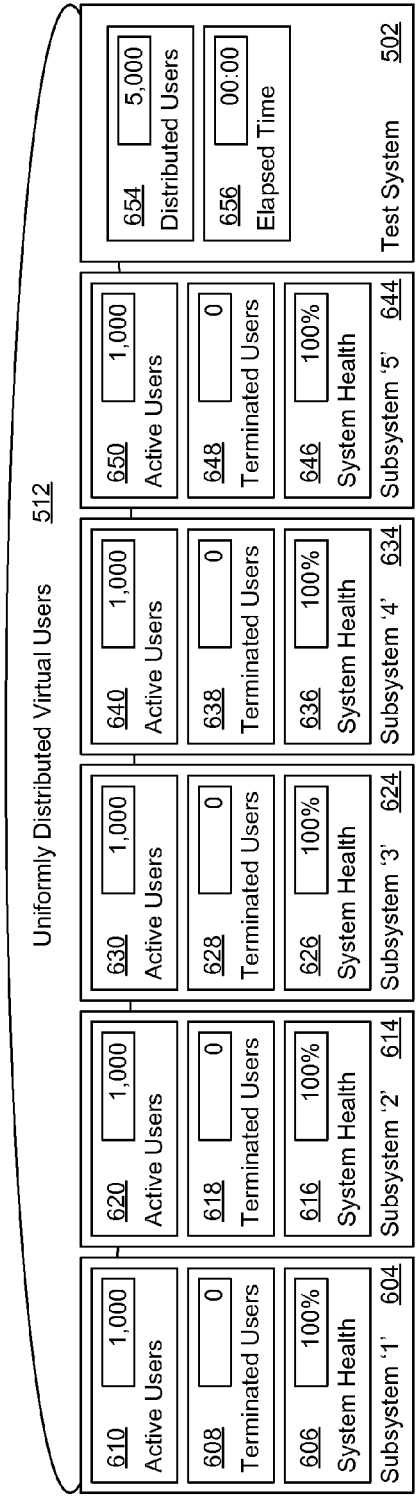
*Prior Art FIGURE 6a*
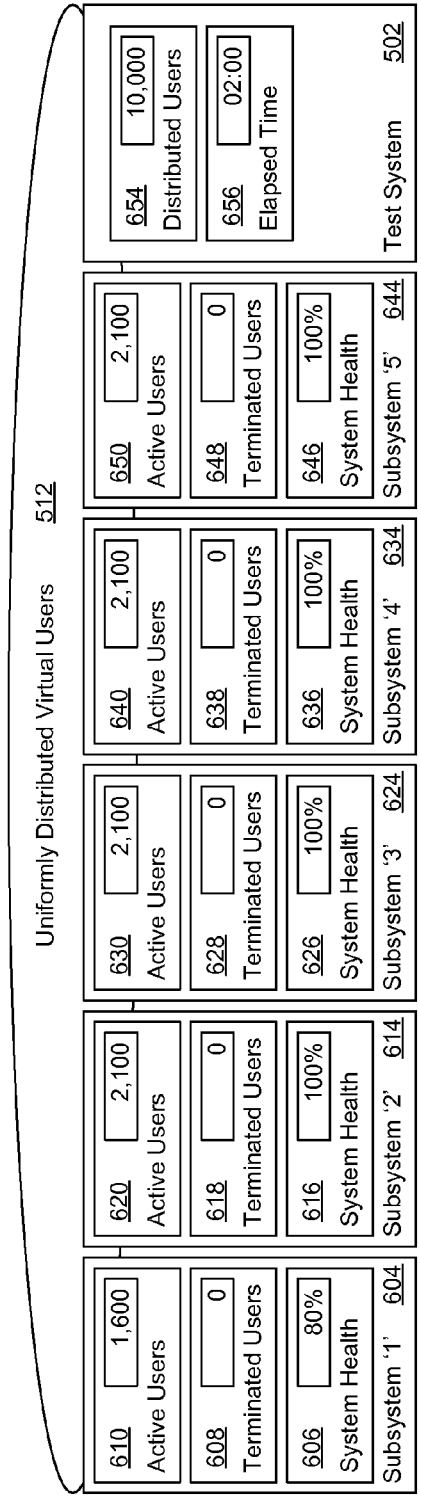
*Prior Art FIGURE 6b*

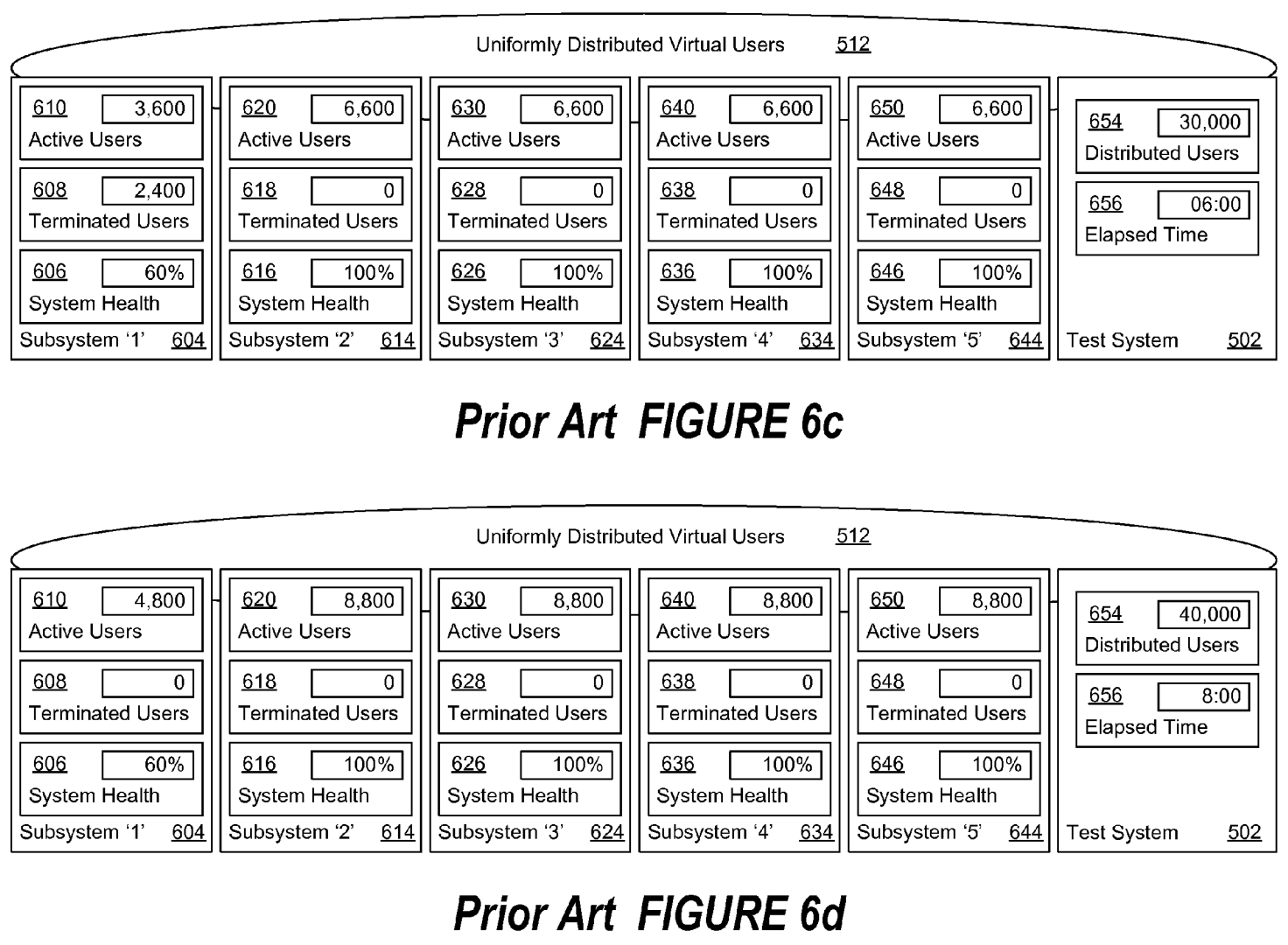

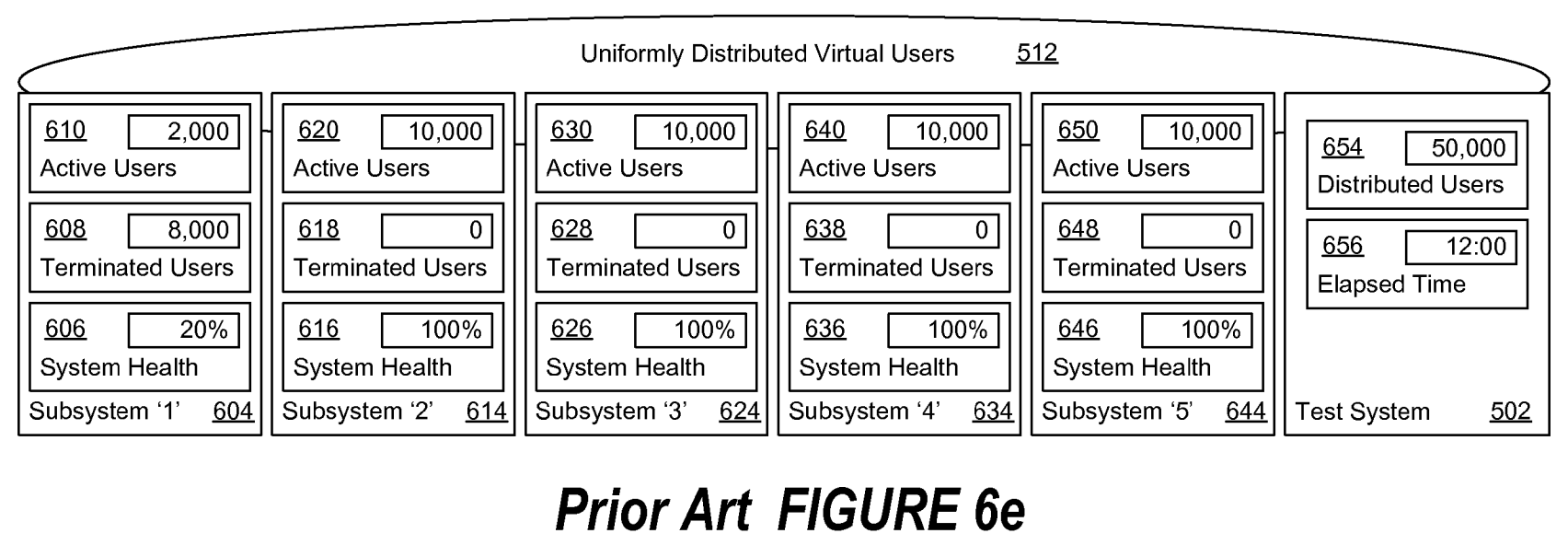

SYSTEM AND METHOD TO OPTIMALLY MANAGE PERFORMANCE'S VIRTUAL USERS AND TEST CASES

BACKGROUND OF THE INVENTION

The present invention relates in general to the field of computers and other data processing systems including hardware, software and processes. More specifically, the present invention relates to a method and system for performing load tests on data processing systems.

The use of computers and the networks that support them has grown substantially in recent years, creating the need for larger, more resilient hardware and software systems to accommodate increased numbers of users and volumes of information. One approach to handling increased user loads and processing volumes is to spread users across a system comprised of a number of subsystems. Achieving desired overall system response time, availability and reliability design goals requires testing these subsystems at the same load levels they would be subjected to in their operational environment. A common load testing approach is to create a realistically large number of virtual users whose behavior mimics that of human users. These virtual users then enact predetermined test cases and procedures that mirror the interaction their human counterparts will have with the system once it is placed in operation.

In general, load testing approaches include establishing a number of operational profiles to target a number of subsystems for 'n' number of virtual users and 'p' number of other parameters. Typically, these operational profiles are applied gradually and uniformly against the target subsystems until full load levels have been reached. If the system fails before full load levels are reached, corrections are made and the load test is run again, repeating the process until the system operates as desired. During the load test, properly functioning subsystems may absorb one or more degraded subsystems' share of the workload, masking their sub-optimal performance and unnecessarily extending the time it takes for the subsystem to eventually fail. When this happens, not only is time lost before the next test run can be made, but insufficient test data is produced, making it more difficult to determine and resolve the cause of the subsystem's failure.

The problem of identifying which subsystems are performing properly and which ones are not can be time consuming since the load test can continue for days before a degraded subsystem fails sufficiently to be identified as a problem. For example, a long-term reliability test may be scheduled to run under load for a predetermined time, e.g., seven days. During the test run, some or all of the virtual users implemented for the test run may terminate due to a sub-system's gradual failure which is masked because healthy subsystems were absorbing its respective share of the workload. Since the virtual users have terminated and their associated operational profiles and code paths are very long, the tester can only gain partial visibility into the cause of the subsystem failure. If, however, the failed subsystem had been able to continue without its share of the workload being offloaded, it would fail sooner and more relevant diagnostic information would be available for determining the cause of the failure.

In many performance testing procedures, testers rectify performance and reliability problems as they are identified and then re-execute the test run to expose the next problem. This incremental approach can be time consuming and expensive. If an ailing subsystem eventually fails in the $48^{th}$, $72^{nd}$ or $96^{th}$ hour of a long-term test run, the problem is exacerbated as significant time is added to each test run interval.

SUMMARY OF THE INVENTION

The present invention includes, but is not limited to, a method, apparatus and computer-usable medium for improved load testing of large systems comprising a plurality of subsystem. In the present invention performance parameters are monitored for a plurality of subsystems. When a subsystem is identified as having degraded performance, virtual users from healthy subsystems are intelligently and stochastically redirected to the degraded subsystem to exacerbate its defective behavior. In various embodiments of the invention, virtual users are progressively targeted at a degraded subsystem to force it to sustain its respective share of a test workload, thereby exacerbating its behavior to facilitate problem determination and resolution. In an embodiment of the invention, virtual users that have failed or terminated in an unhealthy subsystem are replaced by selectively and intelligently redistributing virtual users from healthy systems. As virtual users are redistributed to the degraded subsystem, they too will likely fail or terminate and additional performance and behavior data will be generated as the subsystem degrades to an unusable or non-operational state.

In another embodiment of the invention, more than one subsystem is exhibiting degraded performance and virtual users are redistributed to converge on a first degraded subsystem before converging on the next. In yet another embodiment of the invention, redistribution of virtual users to a degraded subsystem is modulated to prevent the system from failing completely, thereby allowing its performance parameters to be analyzed in a sustained degraded condition.

Embodiments of the present invention comprise a monitoring engine, a rules engine, a decision engine and a reporting engine, which are implemented to achieve a stochastic reassignment of users to degraded subsystems. The monitoring engine observes subsystem performance indicators, including but not limited to, memory usage and central processing unit (CPU) activity, response time, and input/output behavior to identify events, abnormalities and/or failures that will prompt the decision engine to take action. The decision engine determines what actions are taken in the event of failures, including but not limited to, the termination of virtual users and subsystem errors, as well as variations in CPU activity, memory usage, I/O behavior, response times, and the number of applications the virtual user traverses relative to response time. The rules engine defines the distribution and behavior of the virtual users and their parameters in the test run. For example, in one embodiment of the invention, the rules engine generates a rule based on the construction of a normal distribution of subsystem response time using a statistical formula for calculating the median, mean, variance, mean deviation, and standard deviation. The reporting engine provides data and information on activities, failures, and events that occur during the test run to facilitate failure cause determination. The data provided by the reporting engine includes, but is not limited to, attributes and descriptions of a healthy subsystem versus an unhealthy subsystem based on predetermined performance goals for each subsystem and the performance delta between a subsystem's current state and its optimum state.

In an embodiment of the invention, the various engines are embedded as components of a stress or performance testing system. In another embodiment of the invention, the engines are implemented as a proxy that manages the control logic of an existing stress or performance testing system. In these and other embodiments of the invention, the goal of load testing is not to produce successful test runs but to accelerate the exposure of subsystem performance defects. By incrementally and progressively increasing the number of virtual users that are redirected to a degraded subsystem, its target test load can be maintained to accelerate its time-to-failure. The number of performance defects that are uncovered can thereby be maximized, conserving virtual and human resources, reducing test cycle intervals, and improving code quality. The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 5 is a generalized block diagram depicting a prior art load testing system for testing multiple subsystems;

FIGS. 6a-e are generalized block diagrams depicting a prior art load testing system for testing multiple subsystems through the implementation of increased numbers of virtual users over predetermined time intervals;

FIGS. 8a-e are generalized block diagrams depicting a dynamic load test distributor as implemented in accordance with an embodiment of the invention in a load testing system for testing multiple subsystems through the implementation of dynamically distributed numbers of virtual users according to rules;

DETAILED DESCRIPTION

Figure 4:
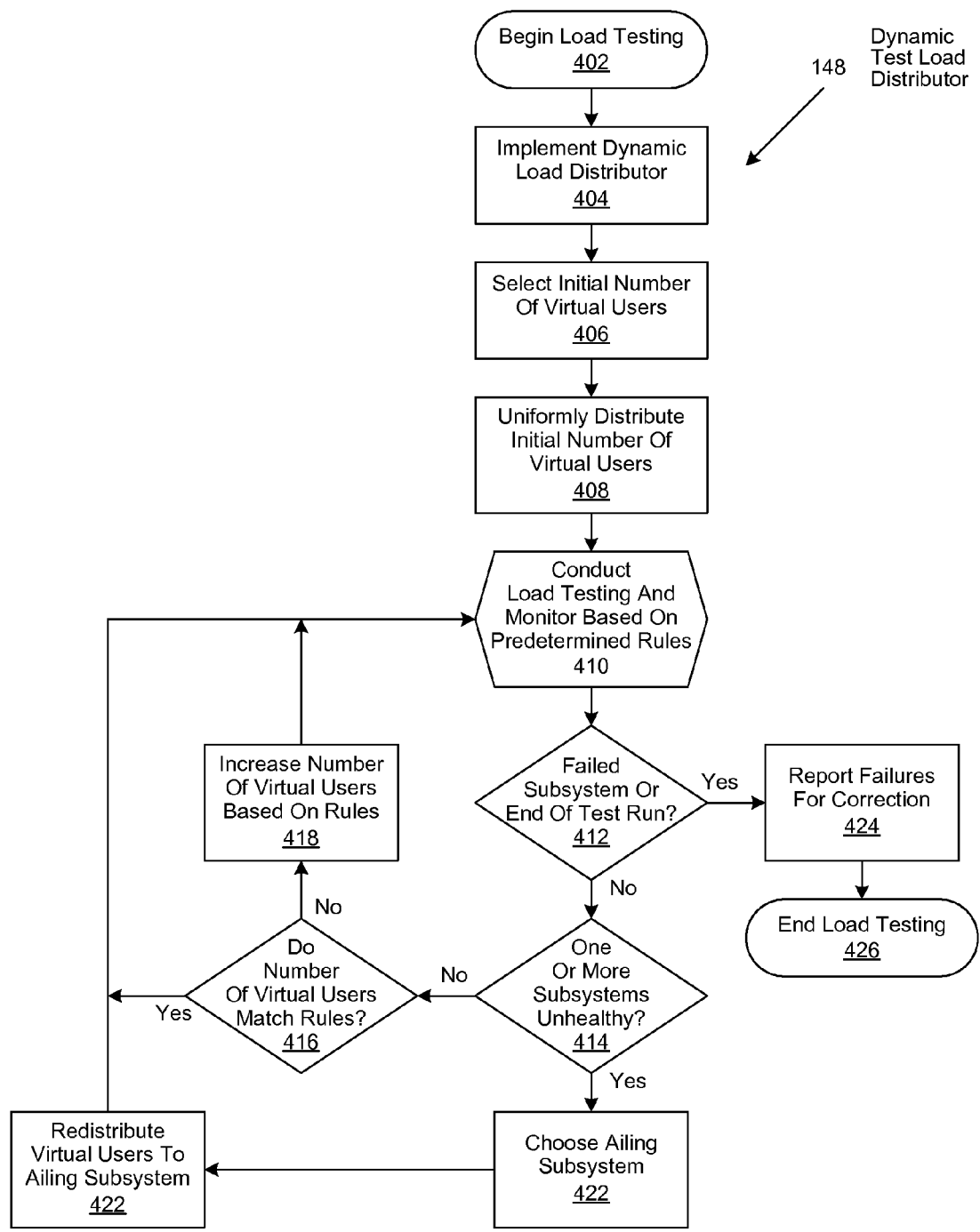
FIG. 4 is a generalized flow chart of a dynamic test load distributor as implemented in accordance with an embodiment of the invention.

With reference now to the figures, and in particular to FIG. 4, there is depicted a method, apparatus and computer-usable medium for improved load testing of subsystems comprising a larger system by intelligently and stochastically distracting virtual users from healthy subsystems such that they collaboratively converge on a subsystem exhibiting operating health problems.

Figure 1:
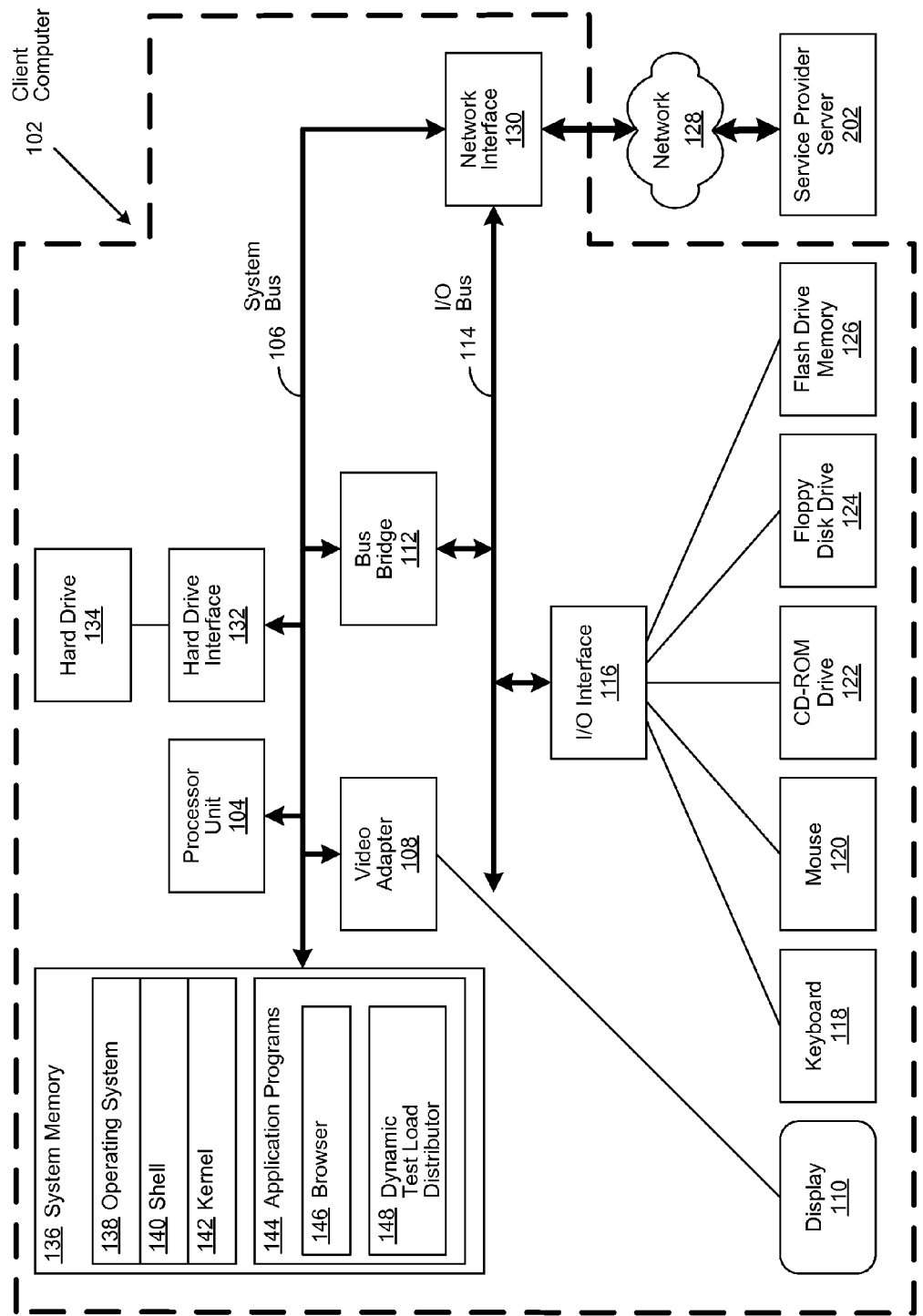
FIG. 1 depicts an exemplary client computer in which the present invention may be implemented.

With reference now to FIG. 1, there is depicted a block diagram of an exemplary client computer 102, in which the present invention may be utilized. Client computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 416 may be any known to those skilled in the art of computer architecture, including but not limited to Universal Serial Bus (USB) ports.

Client computer 102 is able to communicate with a service provider server 202 via a network 128 using a network interface 130, which is coupled to system bus 106. Network 128 may be an external network such as the Internet, or an internal network such as an Ethernet or a Virtual Private Network (VPN). Using network 128, client computer 102 is able to use the present invention to access service provider server 202.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes client computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 202.

Application programs 144 in client computer 102's system memory also include a dynamic test load distributor 148. Dynamic test load distributor 148 includes code for implementing the processes described in FIG. 4. In one embodiment, client computer 102 is able to download dynamic test load distributor 148 from service provider server 202.

The hardware elements depicted in client computer 102 are not intended to be exhaustive, but rather are representative to highlight essential components required by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
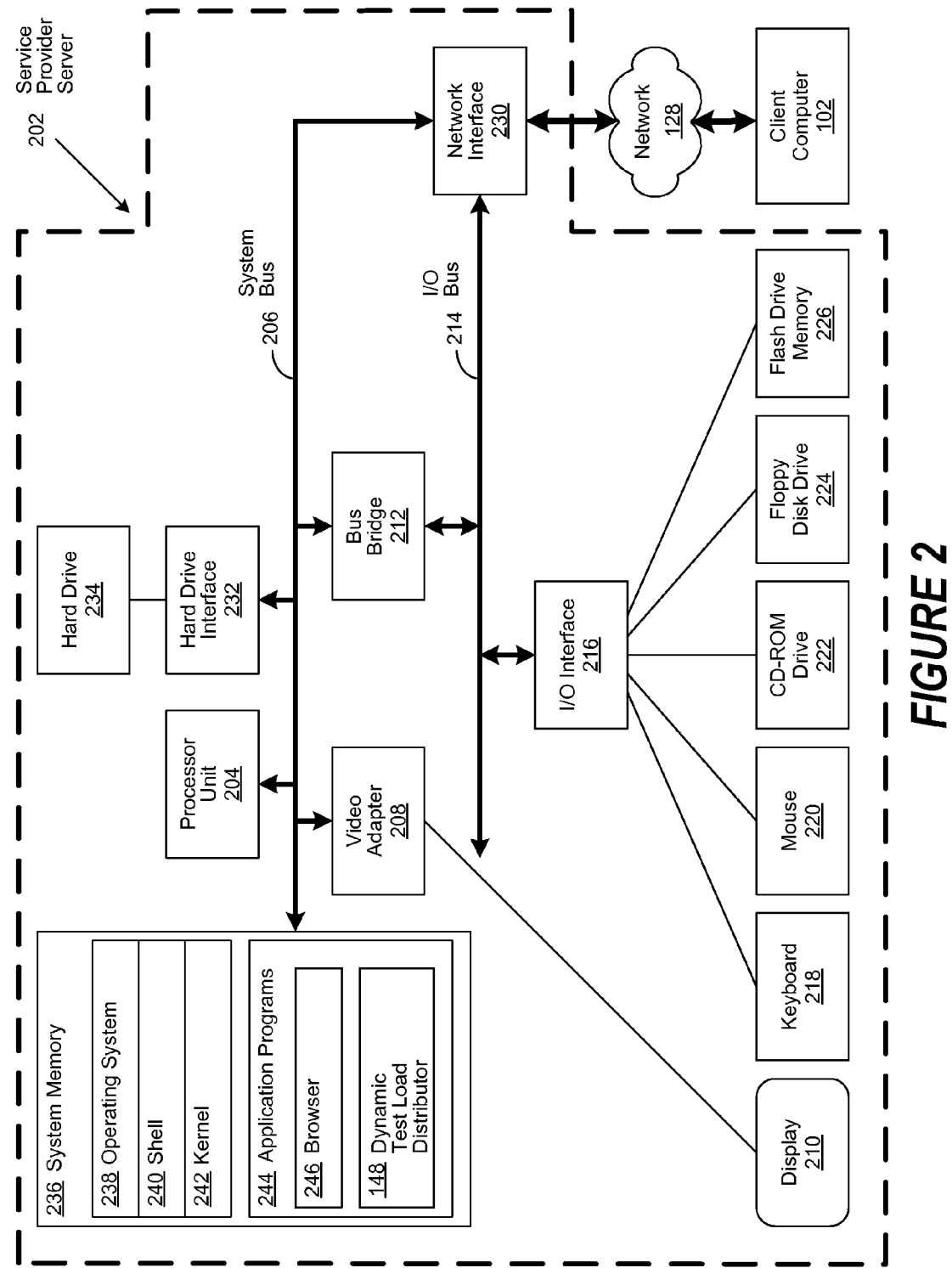
FIG. 2 illustrates an exemplary server from which software for executing the present invention may be deployed and/or implemented for the benefit of a user of the client computer shown in FIG. 1.

As noted above, dynamic test load distributor 148 can be downloaded to client computer 202 from service provider server 202, shown in exemplary form in FIG. 2. Service provider server 202 includes a processor unit 204 that is coupled to a system bus 206. A video adapter 208 is also coupled to system bus 206. Video adapter 208 drives/supports a display 210. System bus 206 is coupled via a bus bridge 212 to an Input/Output (I/O) bus 214. An I/O interface 216 is coupled to I/O bus 214. I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Service provider server 202 is able to communicate with client computer 102 via network 128 using a network interface 230, which is coupled to system bus 206. Access to network 128 allows service provider server 202 to execute and/or download dynamic test load distributor 148 to client computer 102.

System bus 206 is also coupled to a hard drive interface 232, which interfaces with a hard drive 234. In a preferred embodiment, hard drive 234 populates a system memory 236, which is also coupled to system bus 206. Data that populates system memory 236 includes service provider server 202's operating system 238, which includes a shell 240 and a kernel 242. Shell 240 is incorporated in a higher level operating system layer and utilized for providing transparent user access to resources such as application programs 244, which include a browser 246, and a copy of dynamic test load distributor 148 described above, which can be deployed to client computer 102.

The hardware elements depicted in service provider server 202 are not intended to be exhaustive, but rather are representative to highlight essential components required by the present invention. For instance, service provider server 202 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 202 performs all of the functions associated with the present invention (including execution of dynamic test load distributor 148), thus freeing client computer 102 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Figure 3:
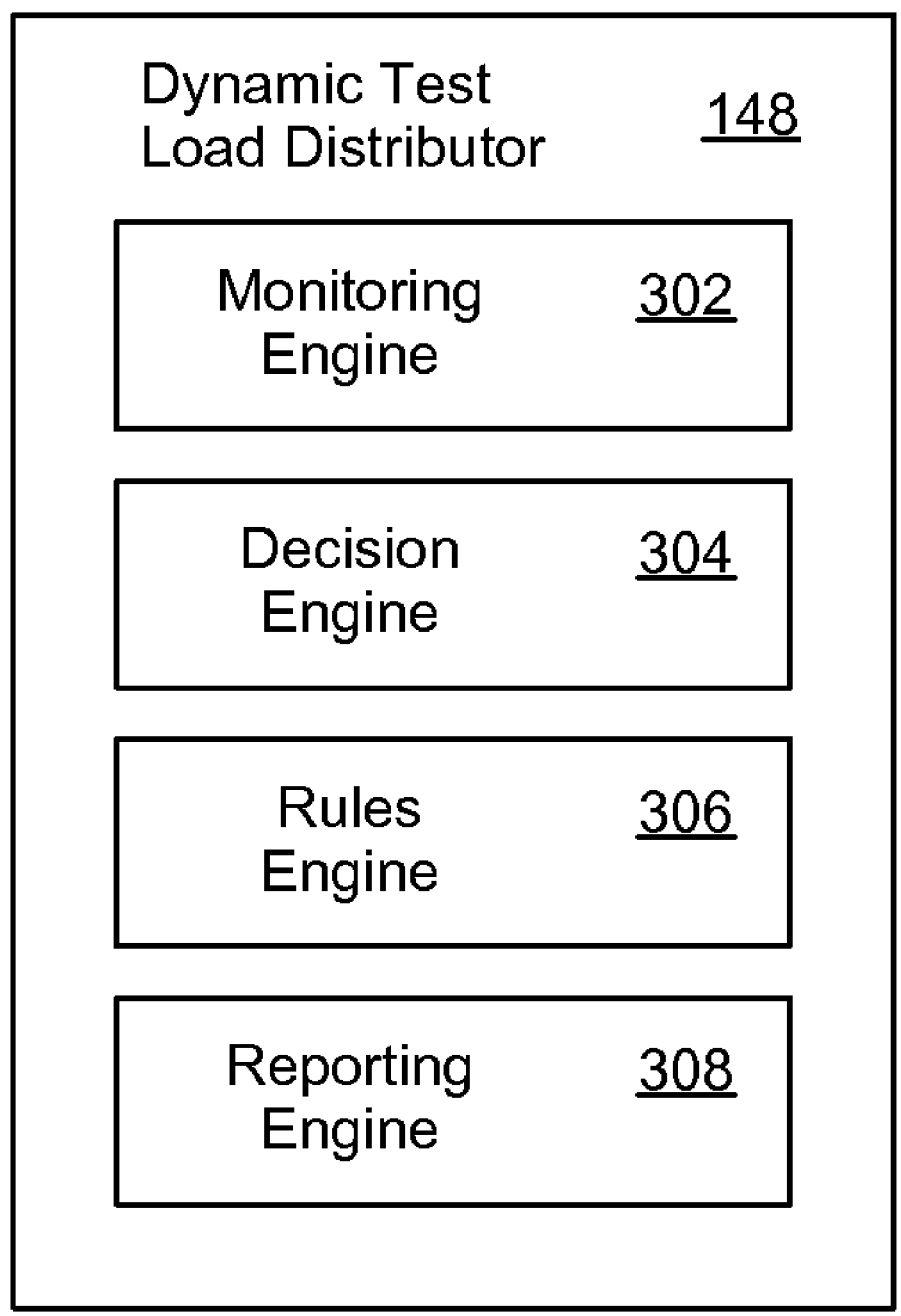
FIG. 3 is a generalized block diagram of a dynamic test load distributor as implemented in accordance with an embodiment of the invention.

FIG. 3 is a generalized block diagram of dynamic test load distributor 148 as implemented in accordance with an embodiment of the invention. Dynamic test load distributor 148 comprises monitoring engine 302, decision engine 304, rules engine 306, and reporting engine 308.

Monitoring engine 302 observes subsystem performance indicators, including but not limited to, memory usage and central processing unit (CPU) activity, response time, and input/output behavior to identify events, abnormalities and/or failures that will prompt the decision engine to take action. In an embodiment of the invention, monitoring engine 302 monitors memory and CPU for usage and activity spikes. Other processes are likewise monitored to assist in determining the cause of changes in subsystem behavior, such as, but not limited to, system environment processes. If abnormal behavior is noted in a subsystem, the number of virtual users assigned to it is increased to apply more stress and accelerate its failure. In another embodiment of the invention, response time for each subsystem is monitored. Any change in their respective response time triggers the decision engine to redistribute virtual users as described in greater detail hereinbelow. In yet another embodiment of the invention, monitoring engine 302 examines outputs of each subsystem, comparing it to expected results as well as the operation of automated input and output flows among interdependent subsystems. Should the input from a first subsystem to a second subsystem, or the output from a second subsystem to a first subsystem signify abnormal operation, virtual users are likewise redistributed to the involved subsystems to further exacerbate their abnormal operation.

Decision engine 304 determines what actions are taken in the event of failures, including but not limited to, the termination of virtual users and subsystem errors, as well as variations in CPU activity, memory usage, I/O behavior, response times, and the number of applications the virtual user traverses relative to response time. Rules engine 306 defines the distribution and behavior of the virtual users and their parameters in the test run. For example, one such rule would be the construction of a normal distribution of subsystem response time based on the statistical formula:

$$\sigma^2 = \frac{\sum (X - \mu)^2}{N}$$

for calculating the median, mean, variance, mean deviation, and standard deviation of subsystem response times, where $\sigma^2$ is the sigma squared for the variance, X is the value of an observation in response time, $\mu$ is the arithmetic mean of the response time, and N is the number of observations. As another example, a rule is implemented that maps a test case (i.e., test scenario) to a predetermined subsystem. If implementation of the test case on the target subsystem begins to generate signs of weakness based on events such as those described in greater detail hereinabove, then the test case "borrows" virtual users from healthy subsystems to further stress the subsystem under test, causing weaknesses and failures to exhibit themselves in less time. Reporting engine 308 provides data and information on activities, failures, and events that occurring during the test run to facilitate failure cause determination, including but not limited to, attributes and description of a healthy versus unhealthy subsystems based on predetermined performance goals for each subsystem, and the performance delta between a subsystem's current state and its optimum state.

FIG. 4 is a generalized flow chart of a dynamic test load distributor 148 as implemented in accordance with an embodiment of the invention. In Step 402, load testing of a system comprised of two or more subsystems begins. In Step 404, a dynamic test load distributor is implemented, with an initial number of virtual users selected in Step 406, which are uniformly distributed in Step 408 across two or more subsystems comprising a system to be load tested. Load testing of two or more subsystems is conducted with virtual users and their status is monitored in Step 410, based on predetermined rules as described in greater detail hereinabove.

If it is determined in Step 412 that a subsystem has failed or that the test run has ended, then observed failures are reported for correction in Step 424 and load testing ends in Step 426. If it is determined in Step 412 that no subsystem has failed and the test run has not ended, and it is determined in Step 414 that all monitored subsystems are healthy, then the number of active virtual users is checked against predetermined rules in Step 416. If the number of active virtual users is less than the number specified by the rules referenced in Step 416, then the required number of additional virtual users are activated and assigned in Step 418 to satisfy the conditions of the rule. For example, a predetermined rule may state that in the fourth hour of the test, 5,000 virtual users should be assigned to each of four subsystems. If the fourth hour of the test has just begun and only 4,000 virtual users are assigned to each subsystem, then 1,000 additional virtual users are activated and assigned to each subsystem to adhere to the rule. Subsystem load testing and monitoring then continues with the additional virtual users in Step 410 as described in greater detail hereinabove.

If it is determined in Step 414 that one or more subsystems are ailing, then a predetermined subsystem is selected in Step 420, based on rules such as those described in greater detail hereinabove, and virtual users are redistributed to further stress the selected subsystem. Subsystem load testing and monitoring then continues with the redistributed virtual users in Step 410 as described in greater detail hereinabove. In an embodiment of the invention, more than one degraded subsystem is selected in Step 420, and virtual users are redistributed between them in Step 422 based on rules described in more detail hereinabove.

Subsystem load testing and monitoring then continues with the virtual redistributed across the selected subsystems users in Step 410 as described in greater detail hereinabove. For example, ten subsystems are placed under load testing and two of the subsystems begin to exhibit the same unhealthy performance symptoms. Instead of redistributing virtual users from the healthy subsystems to just one of the degraded subsystems, virtual users are equally and simultaneously redistributed to both subsystems, with additional virtual users activated and assigned as necessary to accelerate the failure of both subsystems. Additional diagnostic information can be collected and correlated by accelerating their failure rate simultaneously, which will facilitate resolving the cause of failure.

FIG. 5 is a generalized block diagram depicting a prior art load testing system for testing multiple subsystems. In this depiction, test system 502 implements test cases and procedures for load testing of application under test 522 by uniformly distributing a pool of virtual users 512 across subsystem '1' 516 and subsystem '2' 518 through subsystem 'n' 520.

FIGS. 6*a-e* are generalized block diagrams depicting a prior art load testing system for testing multiple subsystems through the implementation of increased numbers of virtual users over predetermined time intervals. In FIGS. 6*a-e*, test system 502, comprising load test elapsed time counter 656 and distributed virtual users counter 654, uniformly distributes a pool of virtual users 512 across subsystems '1' 604, '2' 614, '3' 624, '4' 634, and '5' 644, each designed to sustain a maximum workload of 10,000 virtual users, and respectively comprising active user counters 610, 620, 630, 640, 650, terminated user counters 608, 618, 628, 638, 648, and system health monitors 606, 616, 626, 636, 646. In FIG. 6*a*, test system 502 initiates a load test for subsystems '1' 504, '2' 514, '3' 524, '4' 534, and '5' 544, during which a pool of 50,000 virtual users will be uniformly distributed across target subsystems at the rate of 1,000 virtual users per subsystem, per hour.

Elapsed time counter 656 of test system 502 indicates that at 00:00 hours of the test, issued user counter 654 is indicating that a total of 5,000 virtual users have been uniformly distributed at the rate of 1,000 virtual users per subsystem '1' 604, '2' 614, '3' 624, '4' 634, '5' 644, similarly indicated by respective active user counter 610, 620, 630, 640, 650. Terminated user counters 608, 618, 628, 638, 648 indicate that no virtual users have been terminated on subsystem '1' 604, '2' 614, '3' 624, '4' 634, '5' 644, and their respective system health monitors 606, 616, 626, 636, 646 indicate that all subsystems are operating at 100%.

In FIG. 6*b*, load testing continues for subsystems '1' 604, '2' 614, '3' 624, '4' 634, and '5' 644, with elapsed time counter 656 of test system 502 indicating that at 02:00 hours of testing, a total of 10,000 virtual users have been distributed as indicated by issued user counter 654. However, active user counters 620, 630, 640, 650 of subsystem '2' 614, '3' 624, '4' 634, or '5' 644, indicate a load of 2,100 virtual users each, and active user counter 610 of subsystem '1' 604 indicates a load of 1,600 virtual users. This is due to subsystem '1' 604 operating at 80%, as indicated by its system health monitor 606, with the remaining 20% of its assigned workload being uniformly absorbed by the other subsystems, which are healthy. As a result, no virtual users have been terminated on subsystem '1' 604, '2' 614, '3' 624, '4' 634, or '5' 644, as indicated by terminated user counters 608, 618, 628, 638, 648.

In FIG. 6*c*, load testing continues for subsystems '1' 604, '2' 614, '3' 624, '4' 634, and '5' 644, with elapsed time counter 656 of test system 502 indicating that at 06:00 hours of testing, a total of 30,000 virtual users have been distributed as indicated by issued user counter 654. However, active user counters 620, 630, 640, 650 of subsystem '2' 614, '3' 624, '4' 634, '5' 644, indicate a load of 6,600 virtual users each, and active user counter 610 of subsystem '1' 604 indicates a load of 3,600 virtual users. This is due to subsystem '1' 604 operating at 60%, as indicated by its system health monitor 606, with the remaining 40% of its assigned workload being uniformly absorbed by the other subsystems, which are healthy. As a result, no virtual users have been terminated on subsystem '1' 604, '2' 614, '3' 624, '4' 634, '5' 644, as indicated by terminated user counters 608, 618, 628, 638, 648.

In FIG. 6d, load testing continues for subsystems '1' 604, '2' 614, '3' 624, '4' 634, and '5' 644, with elapsed time counter 656 of test system 502 indicating that at 08:00 hours of testing, a total of 40,000 virtual users have been distributed as indicated by issued user counter 654. However, active user counters 620, 630, 640, 650 of subsystem '2' 614, '3' 624, '4' 634, and '5' 644, indicate a load of 8,800 virtual users each, and active user counter 610 of subsystem '1' 604 indicates a load of 4,800 virtual users. This is due to subsystem '1' 604 operating at 60%, as indicated by its system health monitor 606, with the remaining 40% of its assigned workload being uniformly absorbed by the other subsystems, which are healthy. As a result, no virtual users have been terminated on subsystem '1' 604, '2' 614, '3' 624, '4' 634, or '5' 644, as indicated by terminated user counters 608, 618, 628, 638, 648.

In FIG. 6e, load testing has terminated for subsystems '1' 604, '2' 614, '3' 624, '4' 634, and '5' 644, with elapsed time counter 656 of test system 502 indicating that at 12:00 hours of testing, a total of 50,000 virtual users have been distributed as indicated by issued user counter 654. However, active user counters 620, 630, 640, 650 of subsystem '2' 614, '3' 624, '4' 634, and '5' 644, indicate having sustained their maximum anticipated load of 10,000 virtual users each, and active user counter 610 of subsystem '1' 604 indicates a load of only 2,000 virtual users. This is due to subsystem '1' 604 operating at 20%, as indicated by its system health monitor 606, with the remaining 80% of its assigned workload not being uniformly absorbed by the other, previously healthy subsystems, as they were unable to absorb additional workload from degraded subsystem '1' 604. As a result, while no virtual users have been terminated on subsystem '2' 614, '3' 624, '4' 634, or '5' 644, as indicated by their respective terminated user counters 618, 628, 638, 648, 8,000 virtual users have been terminated on subsystem '1' 604, as indicated by its terminated user counter 608. While subsystem '1' 604 eventually failed the load test, it required twelve hours of elapsed time and it only occurred when subsystems '2' 614, '3' 624, '4' 634, '5' 644, were no longer able to absorb the assigned workload subsystem '1' 604 was unable to support.

Figure 7:
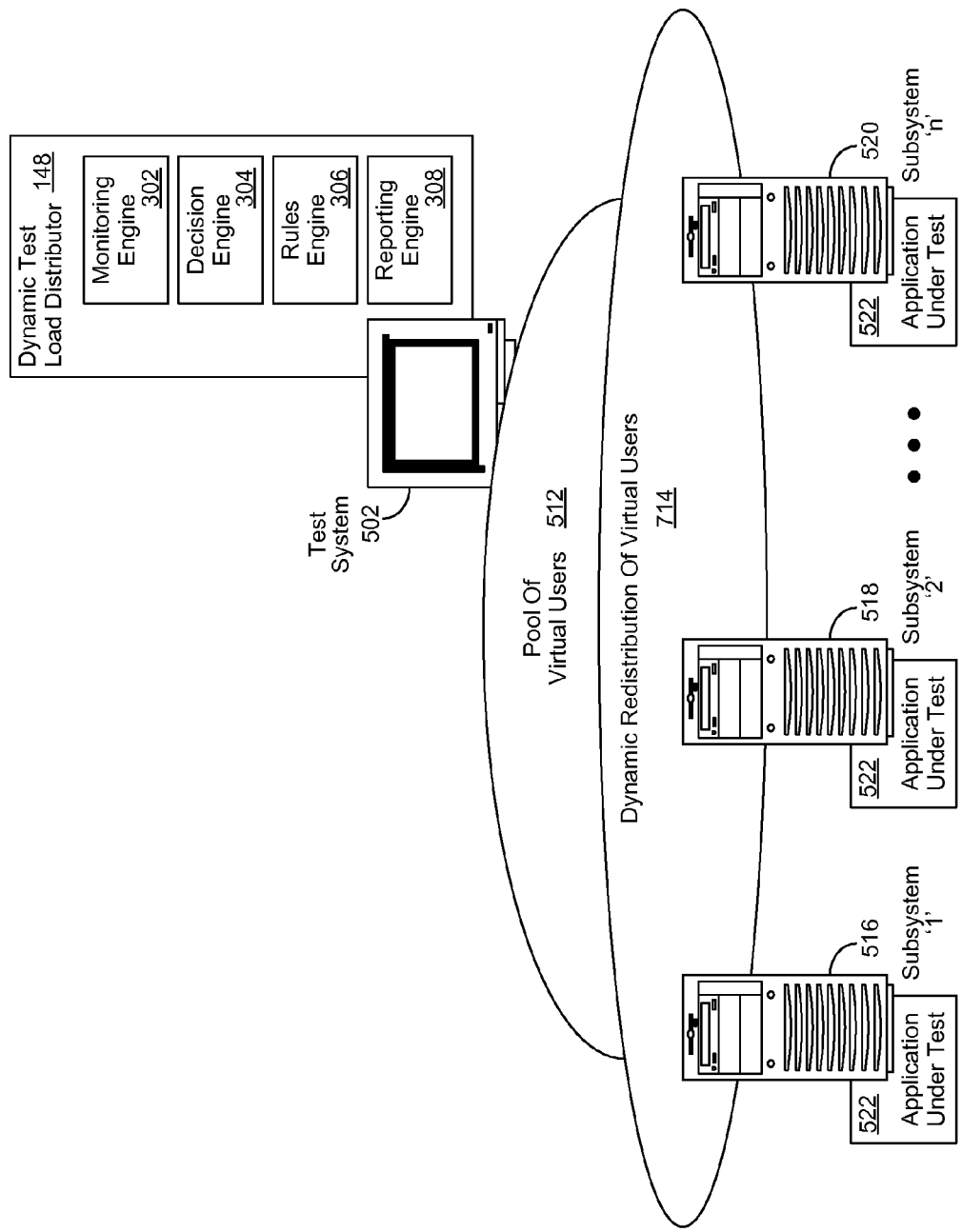
FIG. 7 is a generalized block diagram of a dynamic load test distributor as implemented in accordance with an embodiment of the invention in a load testing system for testing multiple subsystems.

FIG. 7 is a generalized block diagram of dynamic load test distributor 148 as implemented in accordance with an embodiment of the invention in a load testing system for testing multiple subsystems. In this depiction, test system 502 comprises dynamic test load distributor 148, which implements test cases and procedures for load testing of application under test 522 by dynamic distribution 714 of a pool of virtual users 512 across subsystem '1' 516 and subsystem '2' 518 through subsystem 'n' 520. Dynamic test load distributor 148 comprises monitoring engine 302, decision engine 304, rules engine 306, and reporting engine 308 as described in greater detail hereinabove.

FIGS. 8a-e are generalized block diagrams depicting a dynamic load test distributor 148 as implemented in accordance with an embodiment of the invention in a load testing system for testing multiple subsystems through the implementation of dynamically distributed numbers of virtual users according to rules. In FIGS. 8a-e, test system 502, comprising dynamic test load distributor 148, load test elapsed time counter 656 and distributed virtual users counter 654, dynamically distributes a pool of virtual users 714 across subsystems '1' 604, '2' 614, '3' 624, '4' 634, and '5' 644, each designed to sustain a maximum workload of 10,000 virtual users, and respectively comprising active user counters 610, 620, 630, 640, 650, terminated user counters 608, 618, 628, 638, 648, and system health monitors 606, 616, 626, 636, 646.

Figures 8A, 8B:
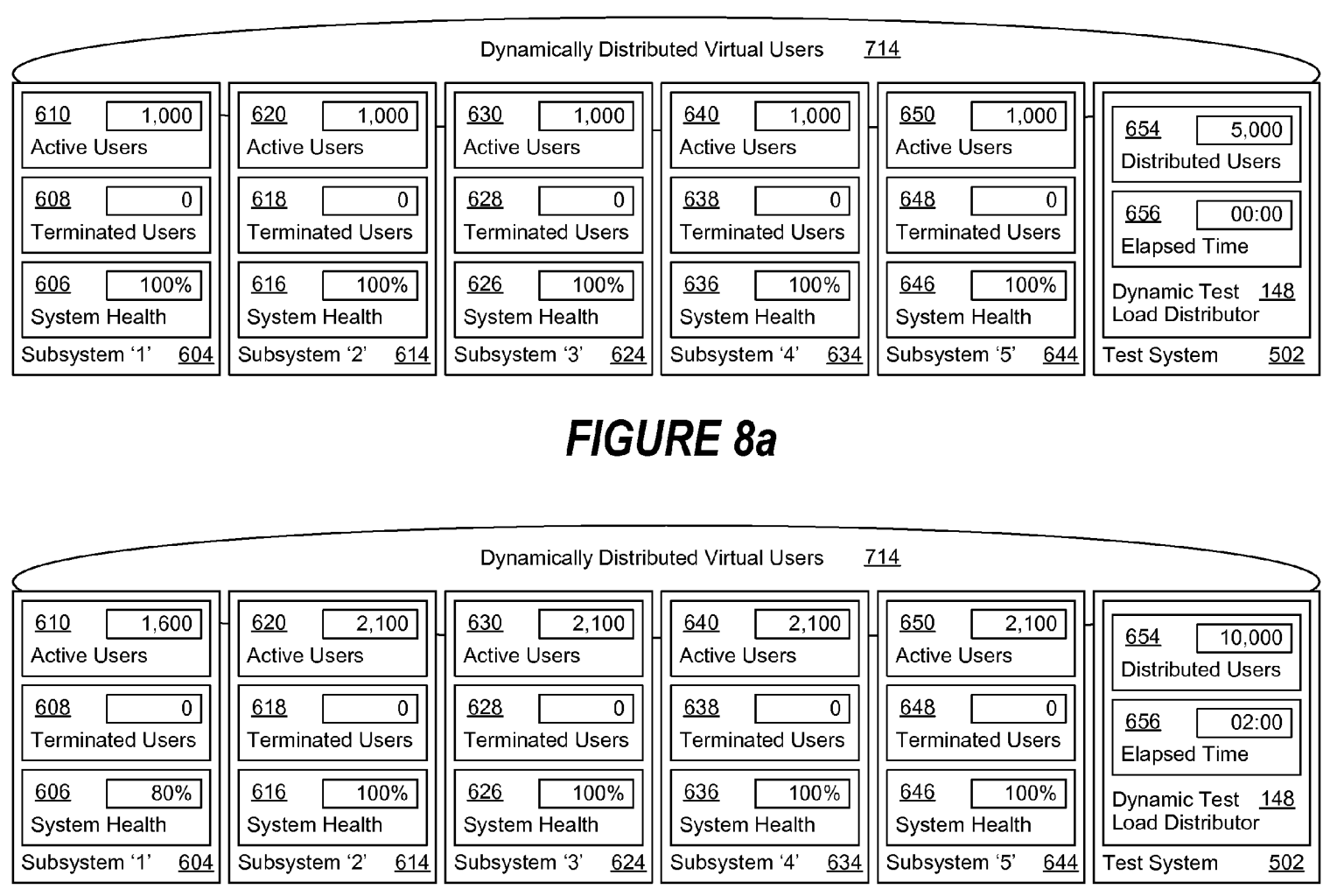

In FIG. 8a, test system 502 initiates a load test for subsystems '1' 604, '2' 614, '3' 624, '4' 634, and '5' 644, during which a pool of 50,000 virtual users will be uniformly distributed across target subsystems at the rate of 1,000 virtual users per subsystem, per hour. Elapsed time counter 656 of test system 502 indicates that at 00:00 hours of the test, issued user counter 654, is indicating that a total of 5,000 virtual users have been uniformly distributed at the rate of 1,000 virtual users per subsystem '1' 604, '2' 614, '3' 624, '4' 634, and '5' 644, similarly indicated by respective active user counter 610, 620, 630, 640, 650. Terminated user counters 608, 618, 628, 638, 648 indicate that no virtual users have been terminated on subsystem '1' 604, '2' 614, '3' 624, '4' 634, '5' 644, and their respective system health monitors 606, 616, 626, 636, 646 indicate that all subsystems are operating at 100%.

In FIG. 8b, load testing continues for subsystems '1' 604, '2' 614, '3' 624, '4' 634, and '5' 644, with elapsed time counter 656 of test system 502 indicating that at 02:00 hours of testing, a total of 10,000 virtual users have been distributed as indicated by issued user counter 654. However, active user counters 620, 630, 640, 650 of subsystem '2' 614, '3' 624, '4' 634, and '5' 644 indicate a load of 2,100 virtual users each, and active user counter 610 of subsystem '1' 604 indicates a load of 1,600 virtual users. This is due to subsystem '1' 604 operating at 80%, as indicated by its system health monitor 606, with the remaining 20% of its assigned workload being uniformly absorbed by the other subsystems, which are healthy. As a result, no virtual users have been terminated on subsystem '1' 604, '2' 614, '3' 624, '4' 634, '5' 644, as indicated by terminated user counters 608, 618, 628, 638, 648. Dynamic test load distributor 148, by observing that subsystem '2' 614, '3' 624, '4' 634, '5' 644, are absorbing 20% of the workload assigned to subsystem '1' 604, begins to dynamically reassign virtual users 714 to subsystem '1' 604.

Figures 8C, 8D:
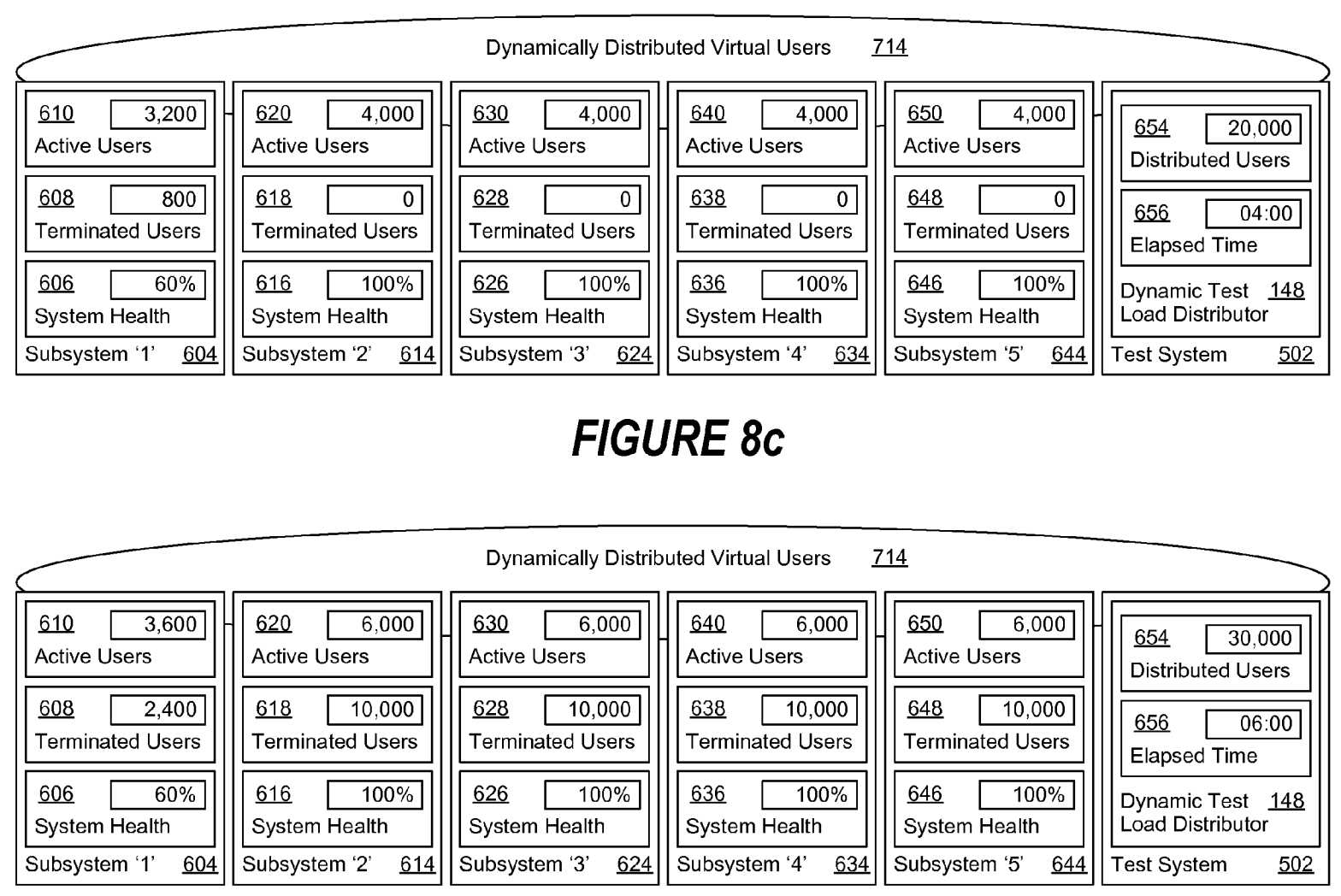

In FIG. 8c, load testing continues for subsystems '1' 604, '2' 614, '3' 624, '4' 634, and '5' 644, with elapsed time counter 656 of test system 502 indicating that at 04:00 hours of testing, a total of 20,000 virtual users have been distributed as indicated by issued user counter 654. However, active user counters 620, 630, 640, 650 of subsystem '2' 614, '3' 624, '4' 634, and '5' 644 indicate a load of 4,000 virtual users each, and active user counter 610 of subsystem '1' 604 indicates a load of 3,200 virtual users due to redistribution of dynamically distributed virtual users 714 by dynamic test load distributor 148. As a result, while no virtual users have been terminated on subsystem '2' 614, '3' 624, '4' 634, or '5' 644, as indicated by their respective terminated user counters 618, 628, 638, 648, 800 virtual users have been terminated on subsystem '1' 604, as indicated by its terminated user counter 608. This is due to subsystem '1' 604 operating at 60%, as indicated by its system health monitor 606, and dynamic test load distributor 148 not allowing the remaining 40% of its assigned workload to be absorbed by the other subsystems, which are healthy.

In FIG. 8d, load testing continues for subsystems '1' 604, '2' 614, '3' 624, '4' 634, and '5' 644, with elapsed time counter 656 of test system 502 indicating that at 06:00 hours of testing, a total of 30,000 virtual users have been distributed as indicated by issued user counter 654. However, active user counters 620, 630, 640, 650 of subsystem '2' 614, '3' 624, '4' 634, and '5' 644, indicate a load of 6,000 virtual users each, and active user counter 610 of subsystem '1' 604 indicates a load of 3,600 virtual users due to redistribution of dynamically distributed virtual users 714 by dynamic test load distributor 148. As a result, while no virtual users have been terminated on subsystem '2' 614, '3' 624, '4' 634, or '5' 644, as indicated by their respective terminated user counters 618, 628, 638, 648, 2,400 virtual users have been terminated on subsystem '1' 604, as indicated by its terminated user counter 608. This is due to subsystem '1' 604 operating at 60%, as indicated by its system health monitor 606, and dynamic test load distributor 148 not allowing the remaining 40% of its assigned workload to be absorbed by the other subsystems, which are healthy. Furthermore, dynamic test load distributor 148, by observing that subsystem '2' 614, '3' 624, '4' 634, and '5' 644, have maintained their loads at 100% as indicated by active user counters 620, 630, 640, 650, decides to maintain their load levels at the current level of 6,000 virtual users each and begin dynamically redistributing their incremental workloads of virtual users 714 to subsystem '1' 604 to accelerate its time-to-failure.

Figure 8E:
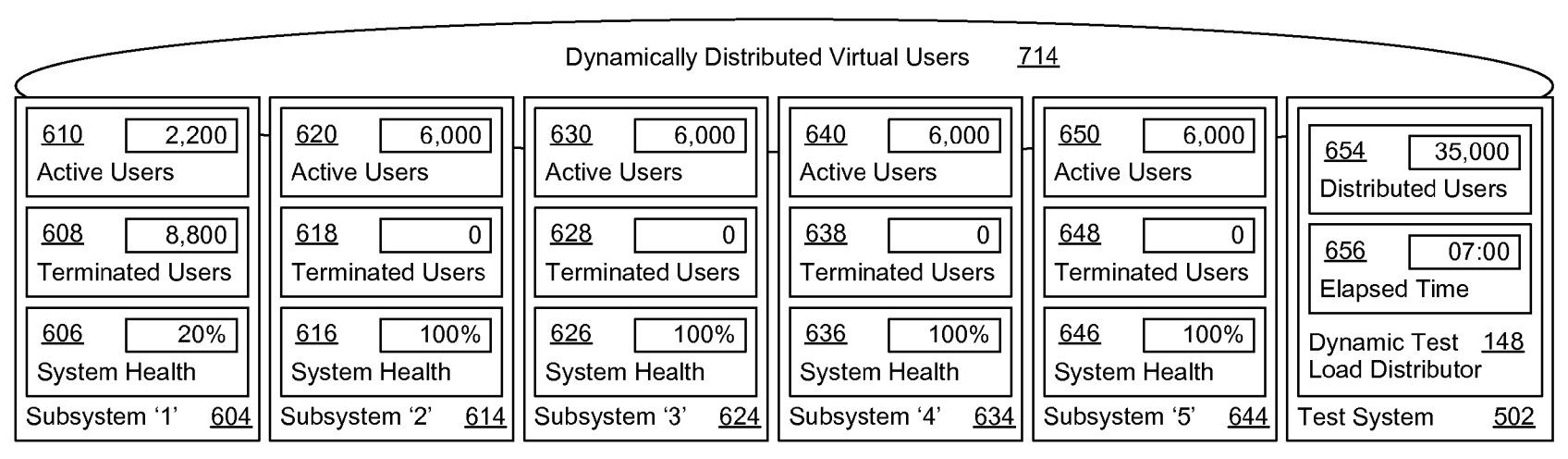

In FIG. 8e, load testing has terminated for subsystems '1' 604, '2' 614, '3' 624, '4' 634, and '5' 644, with elapsed time counter 656 of test system 502 indicating that at 7:00 hours of testing, a total of 35,000 virtual users have been distributed as indicated by issued user counter 654. However, while active user counters 620, 630, 640, 650 of subsystem '2' 614, '3' 624, '4' 634, and '5' 644, indicate having maintained a load of 6,000 virtual users each, active user counter 610 of subsystem '1' 604 indicates maintaining load of only 2,200 virtual users. As a result, while no virtual users have been terminated on subsystem '2' 614, '3' 624, '4' 634, or '5' 644, as indicated by their respective terminated user counters 618, 628, 638, 648, 8,800 virtual users have been terminated on subsystem '1' 604, as indicated by its terminated user counter 608. This is due to dynamic test load distributor 148 maintaining the load levels of subsystem '2' 614, '3' 624, '4' 634, and '5' 644, at 6,000 virtual users each and dynamically redistributing their incremental workloads of virtual users 714 to subsystem '1' 604, resulting in its performance dropping to 20% as indicated by system health indicator 606, thereby causing its failure and terminating the load test. It will be apparent to those of skill in the art that subsystem '1' 604 failed the load test in less time due to dynamic test load distributor 148 dynamically redistributing workloads of virtual users 714 to accelerate its time-to-failure, thereby maximizing the number of performance defects that are uncovered, conserving virtual and human resources, reducing test cycle intervals, and improving code quality.

Thus, the method described herein, and in particular as shown and described in FIG. 4, can be deployed as a process software from service provider server 202 to client computer 102.

Figure 9A:
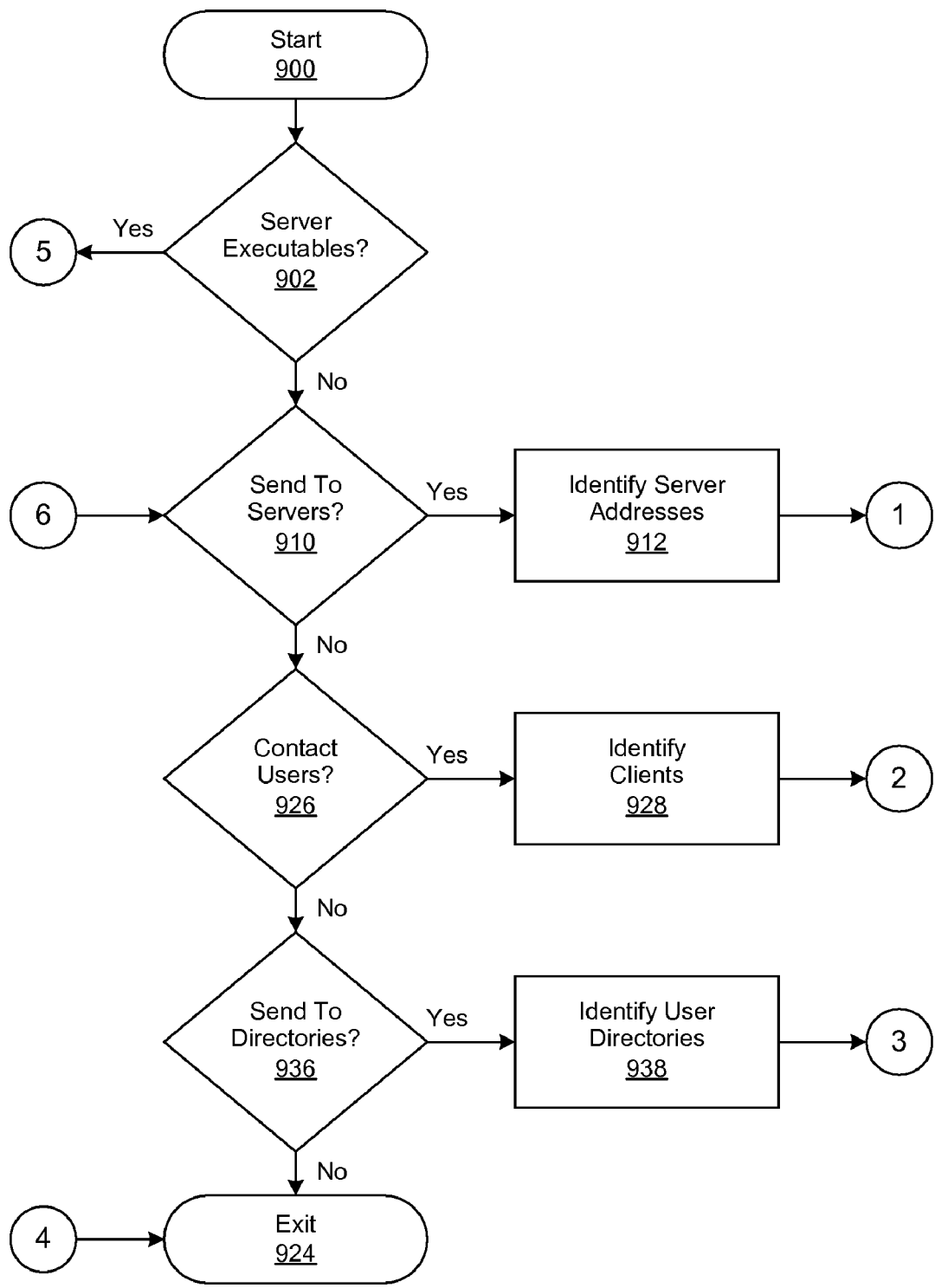
FIGS. 9a-b show a flow-chart of steps taken to deploy software capable of executing the steps shown and described in FIG. 4.
Figure 9B:
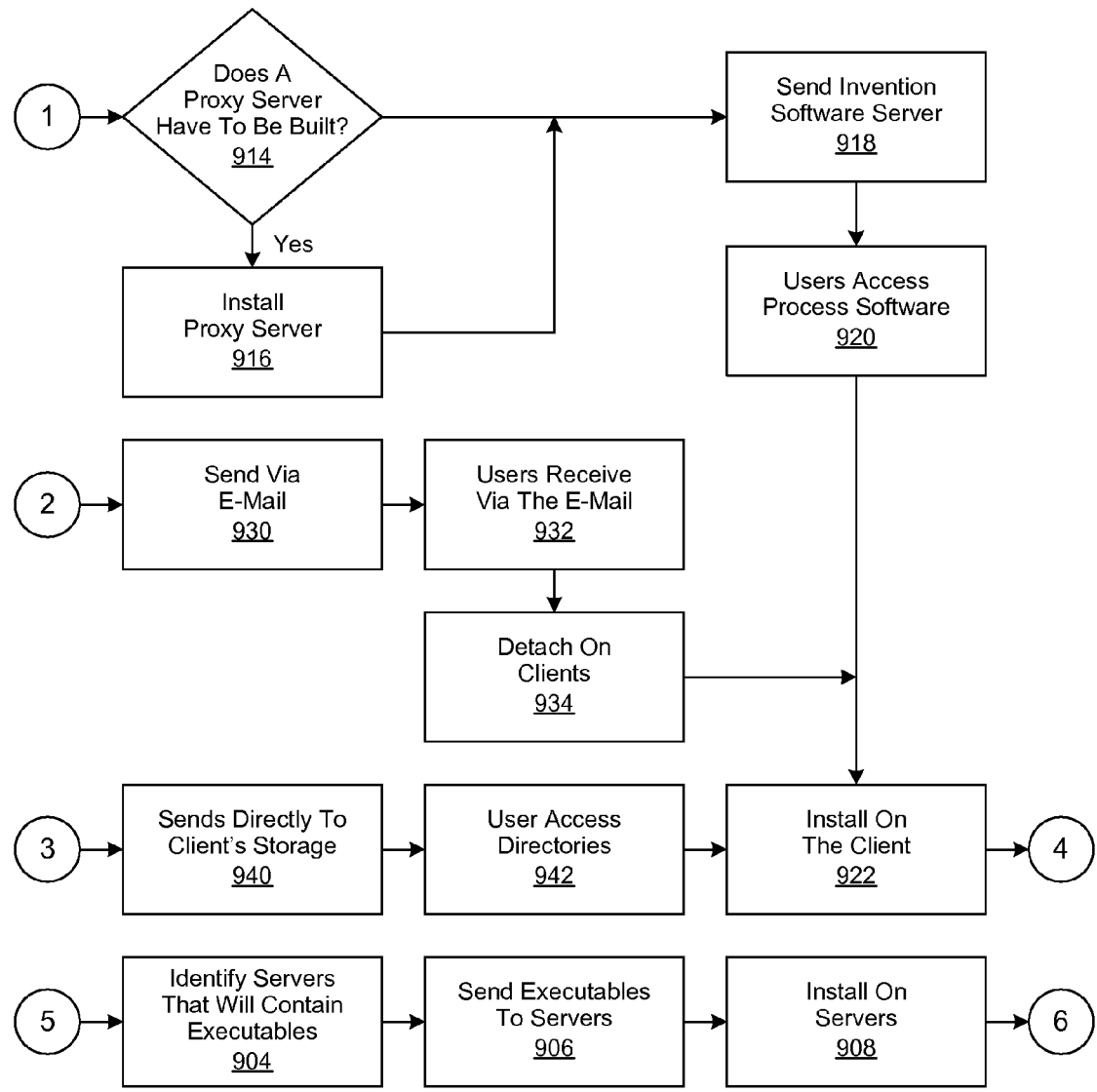

Referring to FIG. 9, step 900 begins the deployment of the process software. The first thing is to determine if there are any programs that will reside on a server or servers when the process software is executed (query block 902). If this is the case, then the servers that will contain the executables are identified (block 904). The process software for the server or servers is transferred directly to the servers' storage via File Transfer Protocol (FTP) or some other protocol or by copying though the use of a shared file system (block 906). The process software is then installed on the servers (block 908).

Next, a determination is made of whether the process software is to be deployed by having users access the process software on a server or servers (query block 910). If the users are to access the process software on servers, then the server addresses that will store the process software are identified (block 912).

A determination is made if a proxy server is to be built (query block 914) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 916). The process software is sent to the servers either via a protocol such as FTP or it is copied directly from the source files to the server files via file sharing (block 918). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 920). Another embodiment is to have the servers automatically copy the process software to each client and then run the installation program for the process software at each client computer. The user executes the program that installs the process software on his client computer (block 922) then exits the process (terminator block 924).

In query step 926, a determination is made whether the process software is to be deployed by sending the process software to users via e-mail. The set of users where the process software will be deployed are identified together with the addresses of the user client computers (block 928). The process software is sent via e-mail to each of the users' client computers (block 930). The users then receive the e-mail (block 932) and then detach the process software from the e-mail to a directory on their client computers (block 934). The user executes the program that installs the process software on his client computer (block 922) then exits the process (terminator block 924).

Lastly a determination is made on whether to the process software will be sent directly to user directories on their client computers (query block 936). If so, the user directories are identified (block 938). The process software is transferred directly to the user's client computer directory (block 940). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 942). The user executes the program that installs the process software on his client computer (block 922) and then exits the process (terminator block 924).

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN.

When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 10A:
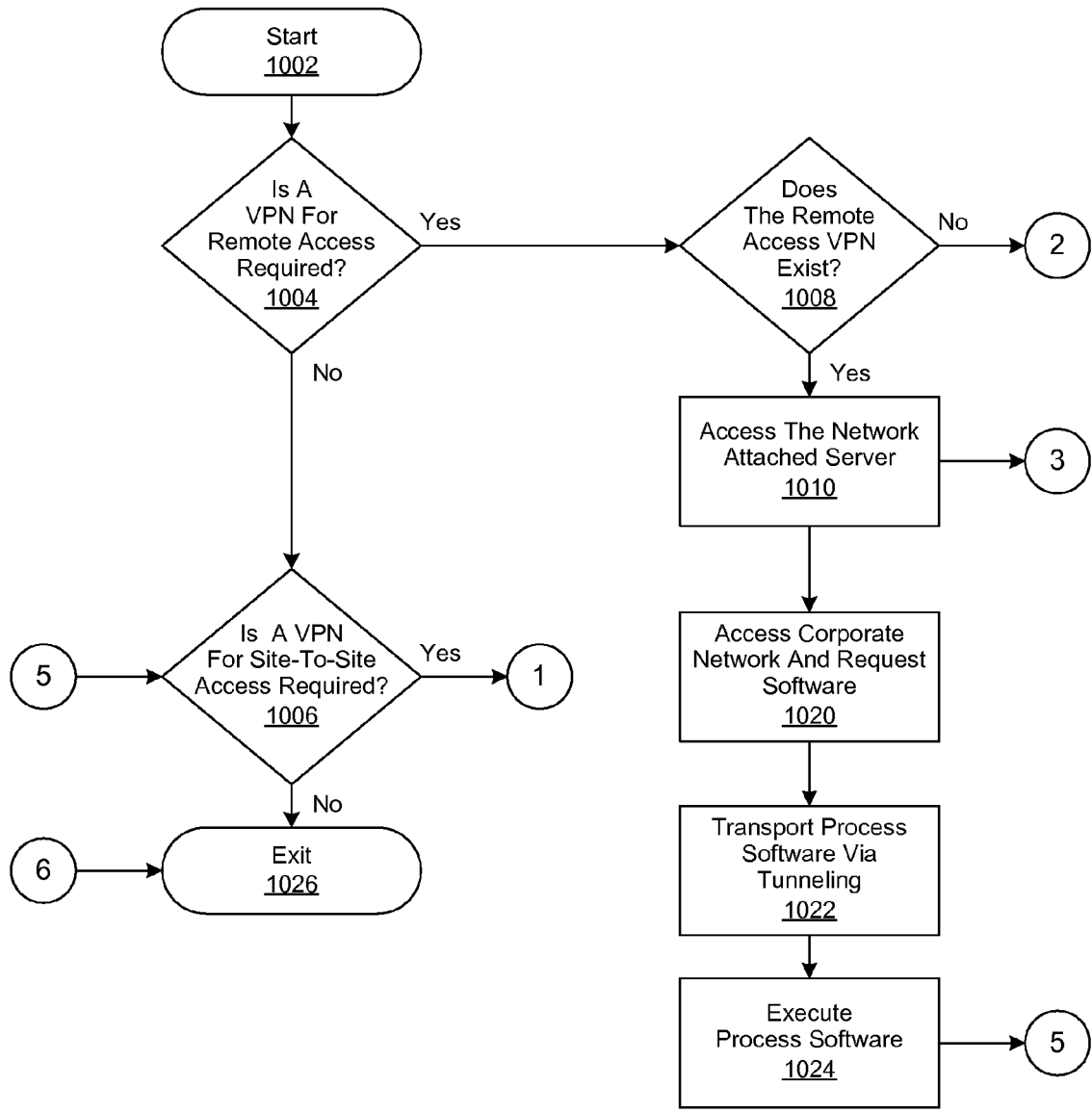
FIGS. 10a-c show a flow-chart of steps taken to deploy in a Virtual Private Network (VPN) software that is capable of executing the steps shown and described in FIG. 4.
Figures 10B, 10C:
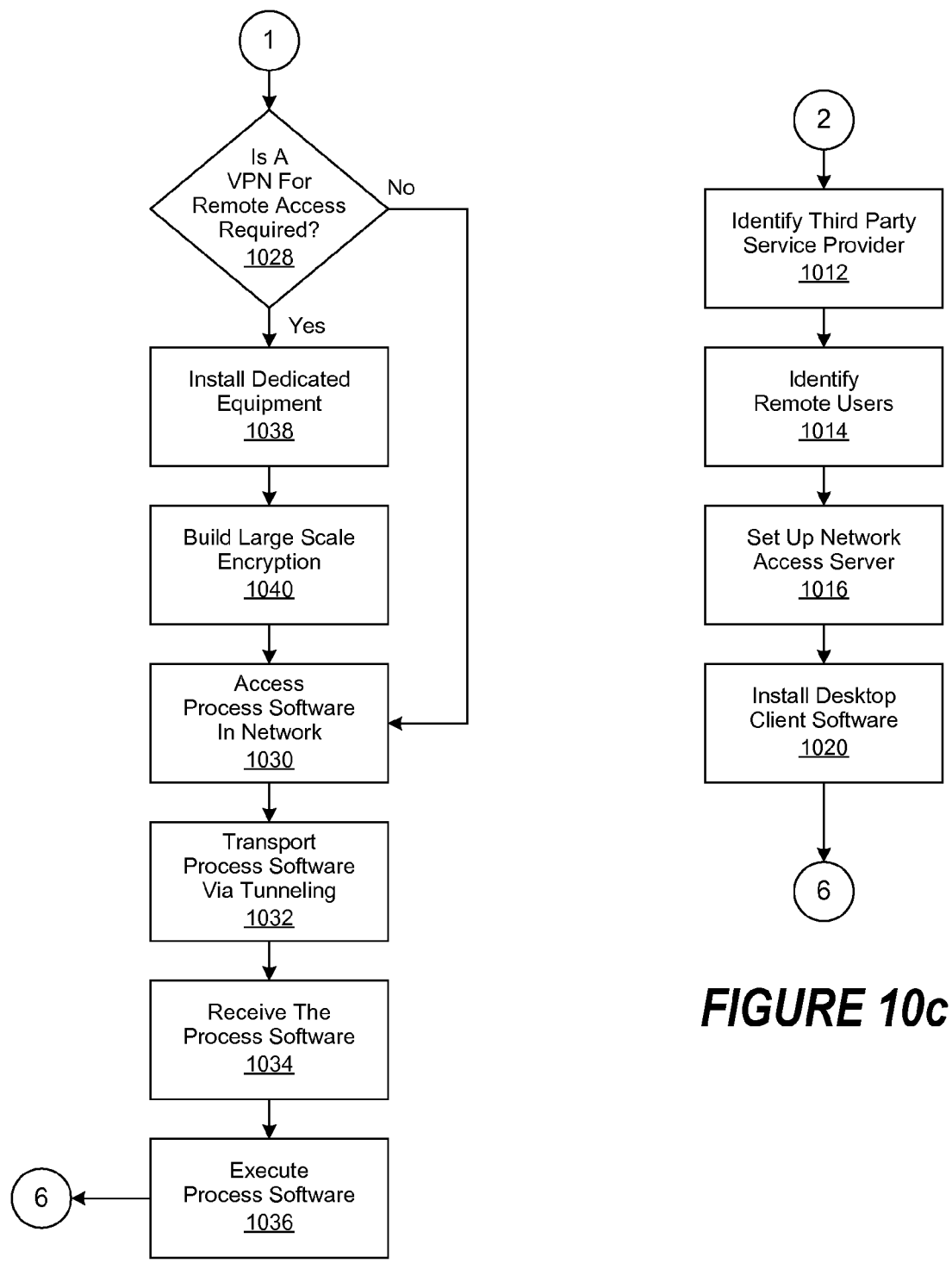

The process for such VPN deployment is described in FIG. 10. Initiator block 1002 begins the Virtual Private Network (VPN) process. A determination is made to see if a VPN for remote access is required (query block 1004). If it is not required, then proceed to query block 1006. If it is required, then determine if the remote access VPN exists (query block 1008).

If a VPN does exist, then proceed to block 1010. Otherwise identify a third party provider that will provide the secure, encrypted connections between the company's private network and the company's remote users (block 1012). The company's remote users are identified (block 1014). The third party provider then sets up a network access server (NAS) (block 1016) that allows the remote users to dial a toll free number or attach directly via a broadband modem to access, download and install the desktop client software for the remote-access VPN (block 1018).

After the remote access VPN has been built or if it been previously installed, the remote users can access the process software by dialing into the NAS or attaching directly via a cable or DSL modem into the NAS (block 1010). This allows entry into the corporate network where the process software is accessed (block 1020). The process software is transported to the remote user's desktop over the network via tunneling. That is, the process software is divided into packets and each packet including the data and protocol is placed within another packet (block 1022). When the process software arrives at the remote user's desktop, it is removed from the packets, reconstituted and then is executed on the remote user's desktop (block 1024).

A determination is then made to see if a VPN for site to site access is required (query block 1006). If it is not required, then proceed to exit the process (terminator block 1026). Otherwise, determine if the site to site VPN exists (query block 1028). If it does not exist, then proceed to block 1030. Otherwise, install the dedicated equipment required to establish a site to site VPN (block 1038). Then build the large scale encryption into the VPN (block 1040).

After the site to site VPN has been built or if it had been previously established, the users access the process software via the VPN (block 1030). The process software is transported to the site users over the network via tunneling (block 1032). That is the process software is divided into packets and each packet including the data and protocol is placed within another packet (block 1034). When the process software arrives at the remote user's desktop, it is removed from the packets, reconstituted and is executed on the site user's desktop (block 1036). The process then ends at terminator block 1026.

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 11A:
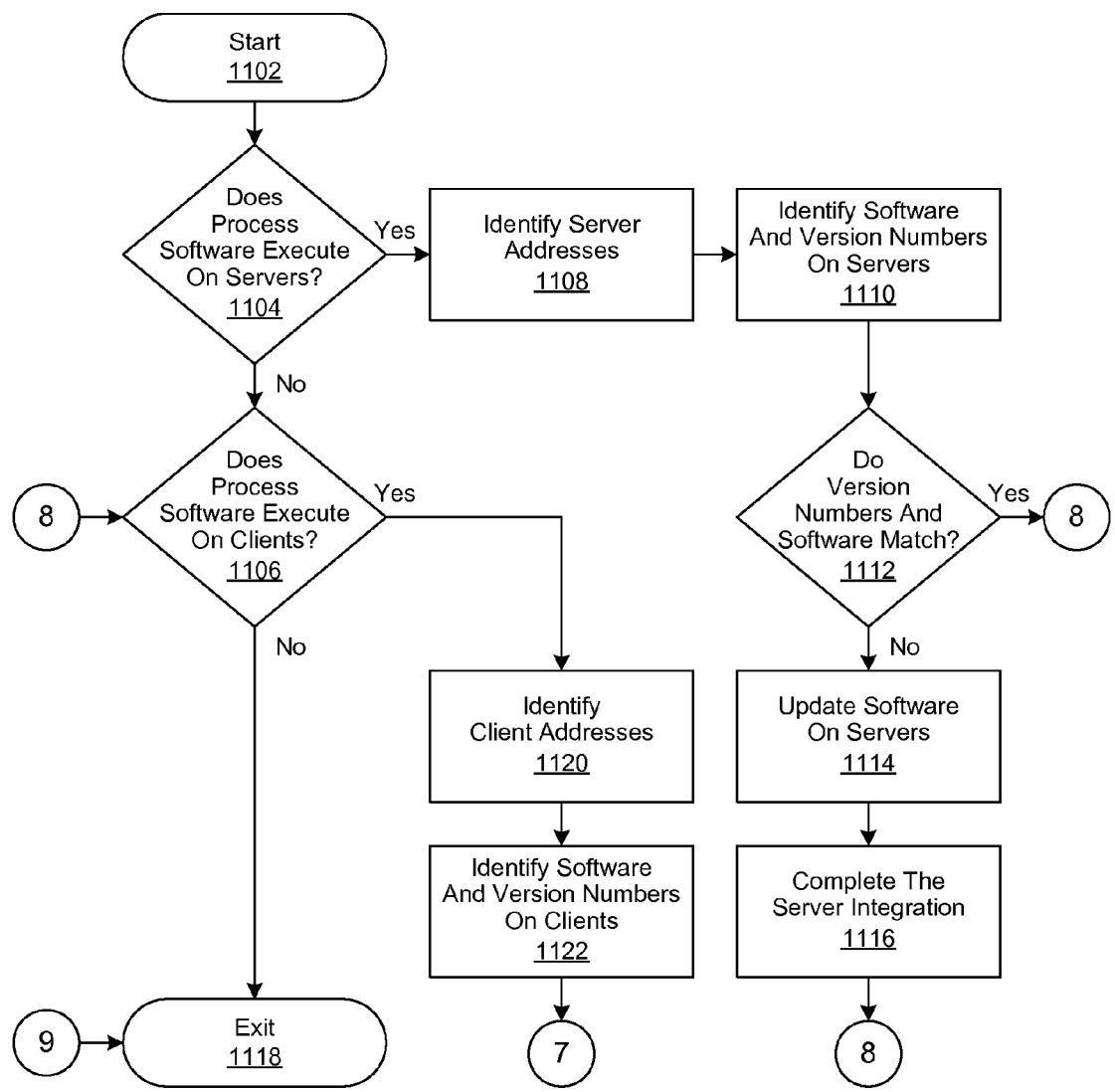
FIGS. 11a-b show a flow-chart showing steps taken to integrate into a computer system software that is capable of executing the steps shown and described in FIG. 4.
Figure 11B:
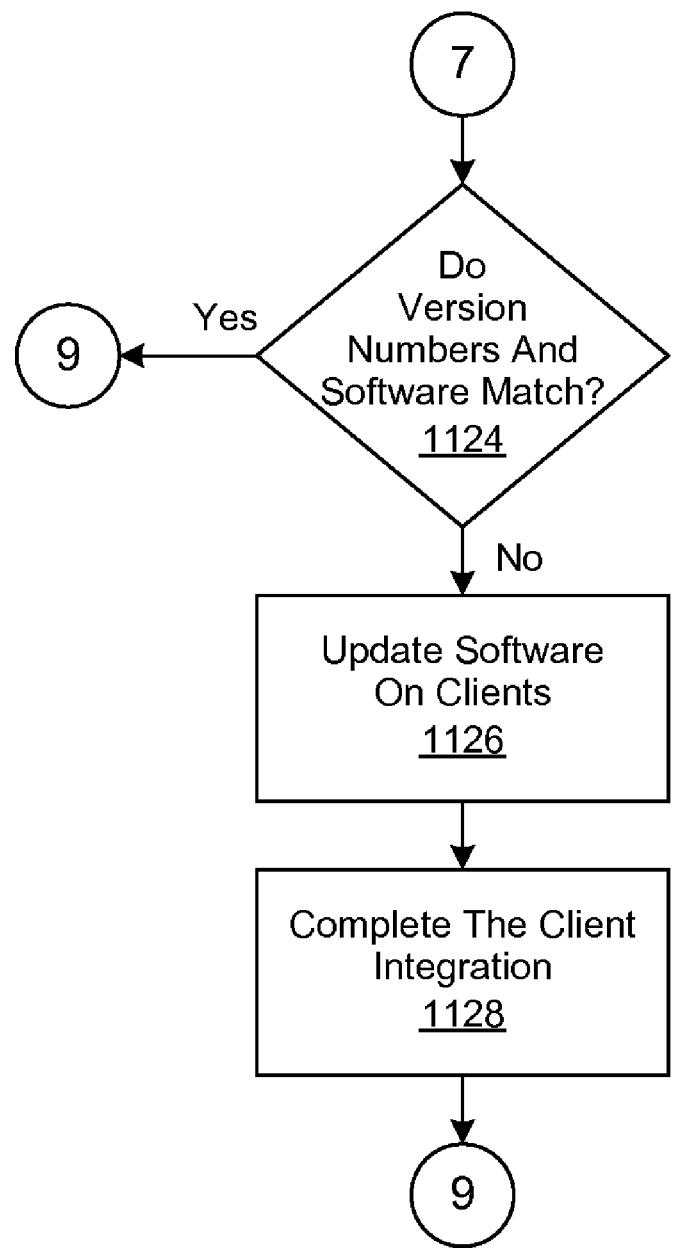

For a high-level description of this process, reference is now made to FIG. 11. Initiator block 1102 begins the integration of the process software. The first tiling is to determine if there are any process software programs that will execute on a server or servers (block 11). If this is not the case, then integration proceeds to query block 1106. If this is the case, then the server addresses are identified (block 1108). The servers are checked to see if they contain software that includes the operating system (OS), applications, and network operating systems (NOS), together with their version numbers, which have been tested with the process software (block 1110). The servers are also checked to determine if there is any missing software that is required by the process software in block 1110.

A determination is made if the version numbers match the version numbers of OS, applications and NOS that have been tested with the process software (block 1112). If all of the versions match and there is no missing required software the integration continues in query block 1106.

If one or more of the version numbers do not match, then the unmatched versions are updated on the server or servers with the correct versions (block 1114). Additionally, if there is missing required software, then it is updated on the server or servers in the step shown in block 1114. The server integration is completed by installing the process software (block 1116).

The step shown in query block 1106, which follows either the steps shown in block 1104, 1112 or 1116 determines if there are any programs of the process software that will execute on the clients. If no process software programs execute on the clients the integration proceeds to terminator block 1118 and exits. If this not the case, then the client addresses are identified as shown in block 1120.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 1122.

A determination is made is the version numbers match the version numbers of OS, applications and NOS that have been tested with the process software (query block 1124). If all of the versions match and there is no missing required software, then the integration proceeds to terminator block 1118 and exits.

If one or more of the version numbers do not match, then the unmatched versions are updated on the clients with the correct versions (block 1126). In addition, if there is missing required software then it is updated on the clients (also block 1126). The client integration is completed by installing the process software on the clients (block 1128). The integration proceeds to terminator block 1118 and exits.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 12A:
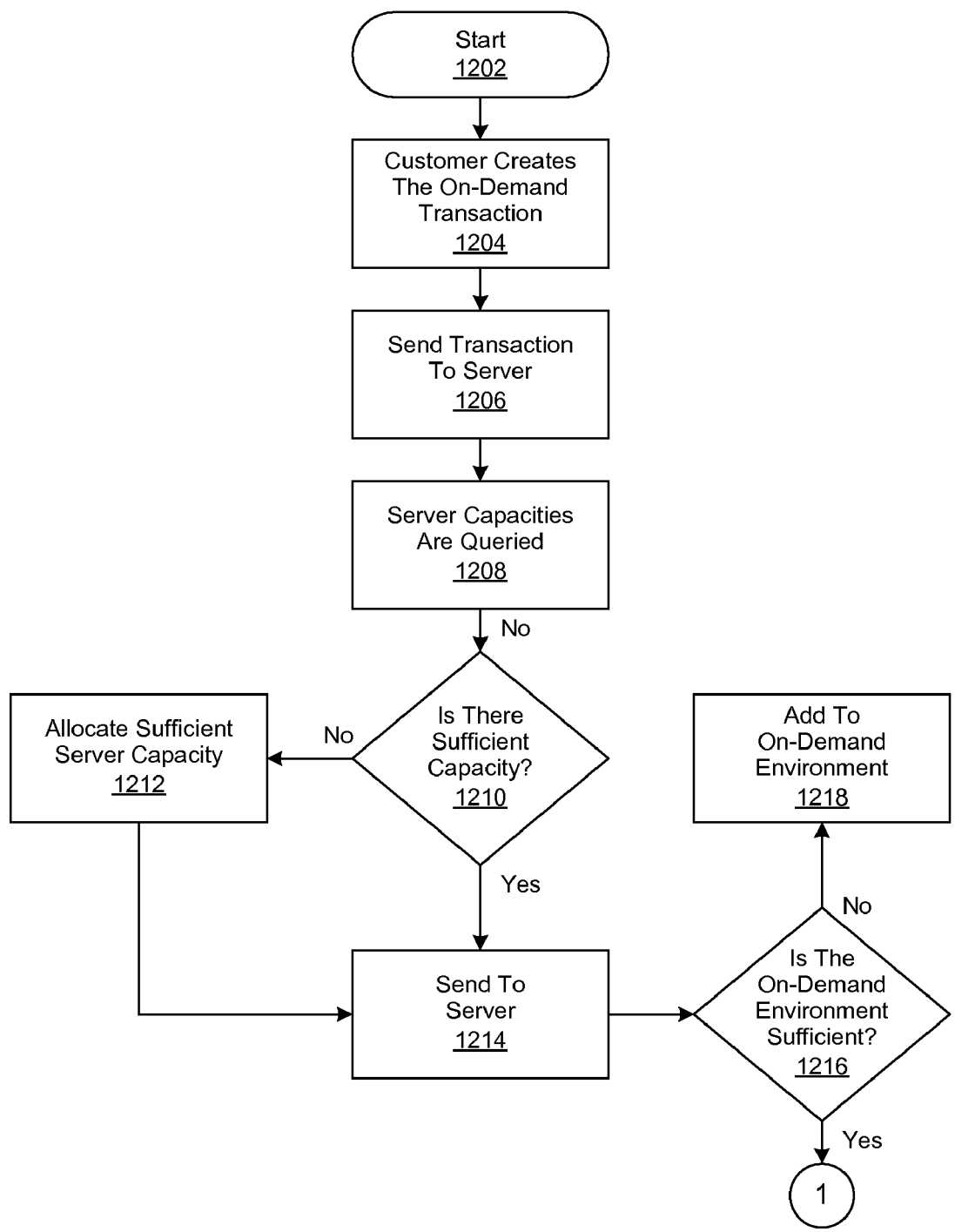
FIGS. 12a-b show a flow-chart showing steps taken to execute the steps shown and described in FIG. 4 using an on-demand service provider.
Figure 12B:
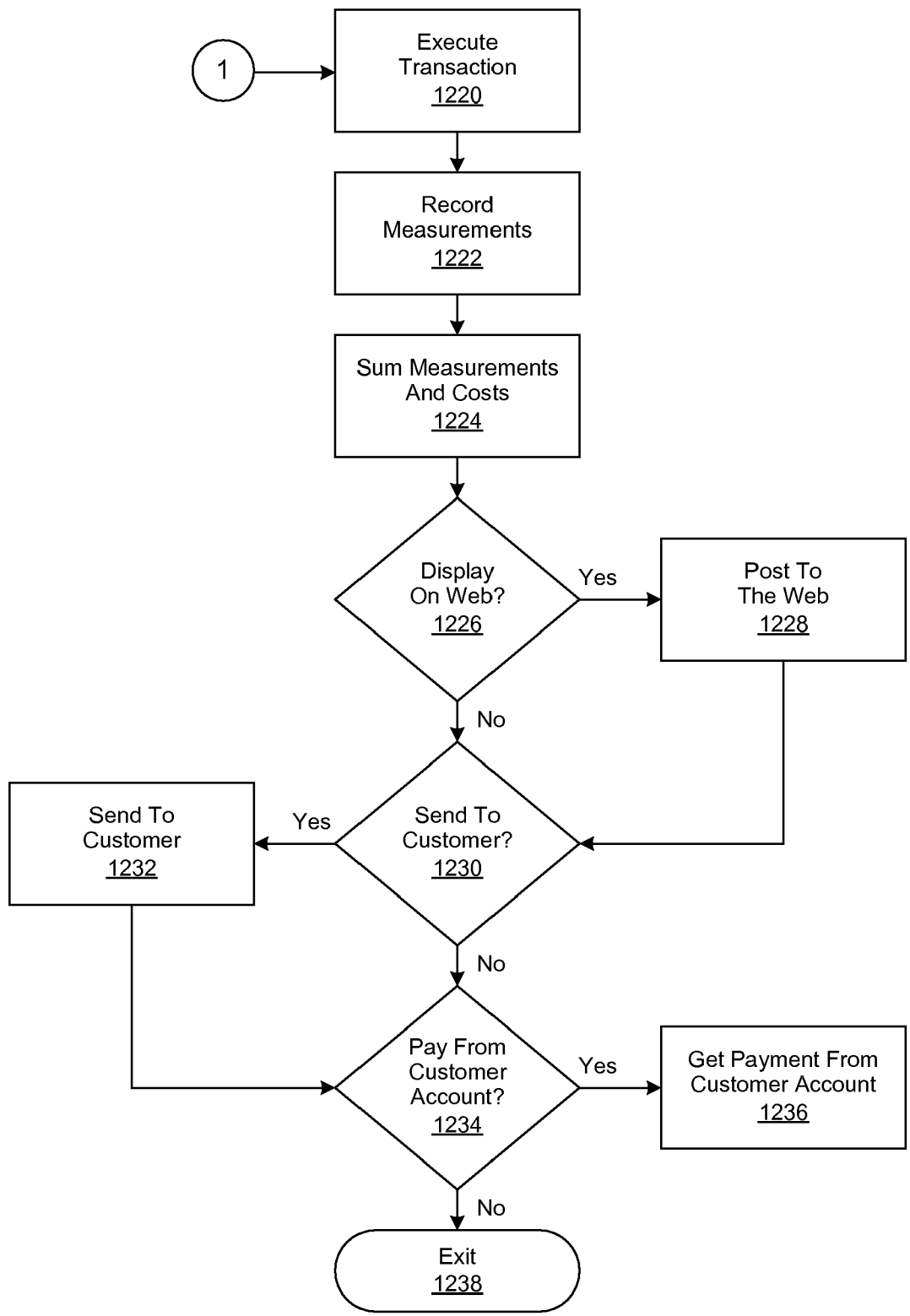

With reference now to FIG. 12, initiator block 1202 begins the On Demand process. A transaction is created than contains the unique customer identification, the requested service type and any service parameters that further, specify the type of service (block 1204). The transaction is then sent to the main server (block 1206). In an On Demand environment the main server can initially be the only server, then as capacity is consumed other servers are added to the On Demand environment.

The server central processing unit (CPU) capacities in the On Demand environment are queried (block 1208). The CPU requirement of the transaction is estimated, then the servers available CPU capacity in the On Demand environment are compared to the transaction CPU requirement to see if there is sufficient CPU available capacity in any server to process the transaction (query block 1210). If there is not sufficient server CPU available capacity, then additional server CPU capacity is allocated to process the transaction (block 1212). If there was already sufficient available CPU capacity then the transaction is sent to a selected server (block 1214).

Before executing the transaction, a check is made of the remaining On Demand environment to determine if the environment has sufficient available capacity for processing the transaction. This environment capacity consists of such things as but not limited to network bandwidth, processor memory, storage etc. (block 1216). If there is not sufficient available capacity, then capacity will be added to the On Demand environment (block 1218). Next the required software to process the transaction is accessed, loaded into memory, then the transaction is executed (block 1220).

The usage measurements are recorded (block 1222). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1224).

If the customer has requested that the On Demand costs be posted to a web site (query block 1226), then they are posted (block 1228). If the customer has requested that the On Demand costs be sent via e-mail to a customer address (query block 1230), then these costs are sent to the customer (block 1232). If the customer has requested that the On Demand costs be paid directly from a customer account (query block 1234), then payment is received directly from the customer account (block 1236). The On Demand process is then exited at terminator block 1238.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method for load testing of a data processing system, comprising a processor operable to execute processing logic used for:
   connecting a first plurality of virtual users to a first subsystem of a data processing system and a second plurality of virtual users to a second subsystem of said data processing system, wherein said first subsystem and said second subsystem are operating in a healthy state;
   processing performance data associated with said first subsystem to detect performance degradation of said first subsystem to a defective state;
   disconnecting individual virtual users of said second plurality of virtual users from said second subsystem and reconnecting said individual virtual users to said first subsystem, wherein said disconnecting and reconnecting is performed selectively to accelerate said performance degradation of said first subsystem; and
   monitoring said performance degradation of said first subsystem to detect the source of said performance degradation.

2. The method of claim 1 further comprising:
   using a rules engine comprising processing logic operable to generate a set of rules for said selective disconnecting and reconnecting.

3. The method of claim 2, further comprising:
   using a decision engine comprising processing logic operable to generate commands for performing said selective disconnecting and reconnecting, wherein said commands are performed according to said set of rules generated by said rules engine.

4. The method of claim 3, further comprising:
   maintaining the number of virtual users in said second plurality of virtual users at a predetermined number to maintain the data processing load of said first subsystem at a predetermined level to accelerate time-to-failure.

5. The method of claim 4, further comprising:
   using a reporting engine to generate diagnostic information relating to the source of said performance degradation.

6. The method of claim 5, wherein said load testing is performed by a testing engine and wherein said rules engine, said decision engine and said reporting engine are implemented as proxies that manage the control logic of said testing system.

7. A system comprising:
   a processor;
   a data bus coupled to the processor; and
   a computer-usable medium embodying computer program code, the computer-usable medium being coupled to the data bus, the computer program code comprising instructions executable by the processor and configured for:
      connecting a first plurality of virtual users to a first subsystem of a data processing system and a second plurality of virtual users to a second subsystem of said data processing system, wherein said first subsystem and said second subsystem are operating in a healthy state;
      processing performance data associated with said first subsystem to detect performance degradation of said first subsystem to a defective state;
      disconnecting individual virtual users of said second plurality of virtual users from said second subsystem and reconnecting said individual virtual users to said first subsystem, wherein said disconnecting and reconnecting is performed selectively to accelerate said performance degradation of said first subsystem; and
      monitoring said performance degradation of said first subsystem to detect the source of said performance degradation.

8. The system of claim 7, wherein the instructions are further configured for:
   using a rules engine comprising processing logic operable to generate a set of rules for said selective disconnecting and reconnecting.

9. The system of claim 8, wherein the instructions are further configured for:
   using a decision engine comprising processing logic operable to generate commands for performing said selective disconnecting and reconnecting, wherein said commands are performed according to said set of rules generated by said rules engine.

10. The system of claim 9, wherein the instructions are further configured for:
    maintaining the number of virtual users in said second plurality of virtual users at a predetermined number to maintain the data processing load of said first subsystem at a predetermined level to accelerate time-to-failure.

11. The system of claim 10, wherein the instructions are further configured for:
    using a reporting engine to generate diagnostic information relating to the source of said performance degradation.

12. The system of claim 11, wherein said load testing is performed by a testing engine and wherein said rules engine, said decision engine and said reporting engine are implemented as proxies that manage the control logic of said testing system.

13. A computer-usable storage medium embodying computer program code, the computer program code comprising computer executable instructions configured for:
    connecting a first plurality of virtual users to a first subsystem of a data processing system and a second plurality of virtual users to a second subsystem of said data processing system, wherein said first subsystem and said second subsystem are operating in a healthy state;
    processing performance data associated with said first subsystem to detect performance degradation of said first subsystem to a defective state;
    disconnecting individual virtual users of said second plurality of virtual users from said second subsystem and reconnecting said individual virtual users to said first subsystem, wherein said disconnecting and reconnecting is performed selectively to accelerate said performance degradation of said first subsystem; and
    monitoring said performance degradation of said first subsystem to detect the source of said performance degradation.

14. The computer-usable storage medium of claim 13, wherein the embodied computer program code further comprises computer executable instructions configured for:
    using a rules engine comprising processing logic operable to generate a set of rules for said selective disconnecting and reconnecting.

15. The computer-usable storage medium of claim 14, wherein the embodied computer program code further comprises computer executable instructions configured for:

using a decision engine comprising processing logic operable to generate commands for performing said selective disconnecting and reconnecting, wherein said commands are performed according to said set of rules generated by said rules engine.

16. The computer-usable storage medium of claim 15, wherein the embodied computer program code further comprises computer executable instructions configured for:

maintaining the number of virtual users in said second plurality of virtual users at a predetermined number to maintain the data processing load of said first subsystem at a predetermined level to accelerate time-to-failure.

17. The computer-usable storage medium of claim 16, wherein the embodied computer program code further comprises computer executable instructions configured for:

using a reporting engine to generate diagnostic information relating to the source of said performance degradation.

18. The computer-usable storage medium of claim 17, wherein said load testing is performed by a testing engine and wherein said rules engine, said decision engine and said reporting engine are implemented as proxies that manage the control logic of said testing system.

19. The computer-useable storage medium of claim 13, wherein the computer executable instructions are deployable to a client computer from a server at a remote location.

20. The computer-useable storage medium of claim 13, wherein the computer executable instructions are provided by a service provider to a customer on an on-demand basis.

\* \* \* \* \*